US010096316B2

(12) United States Patent
Kalns et al.

(10) Patent No.: US 10,096,316 B2
(45) Date of Patent: *Oct. 9, 2018

(54) SHARING INTENTS TO PROVIDE VIRTUAL ASSISTANCE IN A MULTI-PERSON DIALOG

(71) Applicant: SRI International, Menlo Park, CA (US)

(72) Inventors: Edgar T. Kalns, San Jose, CA (US); Douglas A. Bercow, Menlo Park, CA (US); James F. Carpenter, Mountain View, CA (US)

(73) Assignee: SRI International, Menlo Park, CA (US)

( * ) Notice: Subject to any disclaimer, the term of this patent is extended or adjusted under 35 U.S.C. 154(b) by 161 days.

This patent is subject to a terminal disclaimer.

(21) Appl. No.: 14/092,474

(22) Filed: Nov. 27, 2013

(65) Prior Publication Data

US 2015/0149182 A1    May 28, 2015

(51) Int. Cl.
*G10L 21/00* (2013.01)
*G10L 15/18* (2013.01)

(52) U.S. Cl.
CPC .................................... *G10L 15/18* (2013.01)

(58) Field of Classification Search
CPC ...................................................... G10L 21/00
USPC ...................... 704/275, 9; 709/206; 707/769
See application file for complete search history.

(56) References Cited

U.S. PATENT DOCUMENTS

| 6,978,292 | B1 | 12/2005 | Murakami | |
|---|---|---|---|---|
| 7,013,275 | B2 | 3/2006 | Arnold et al. | |
| 7,016,849 | B2 | 3/2006 | Arnold et al. | |
| 8,224,362 | B1* | 7/2012 | Osinga | H04W 4/21 455/466 |
| 8,650,255 | B2* | 2/2014 | O'Sullivan | G06Q 10/10 370/260 |
| 8,949,270 | B2* | 2/2015 | Newton | G06Q 30/02 707/774 |
| 9,002,940 | B2* | 4/2015 | Roche | H04L 51/36 709/204 |

(Continued)

FOREIGN PATENT DOCUMENTS

WO     2011116208 A2     9/2011

OTHER PUBLICATIONS

Deutsch, Alin, et al., "Querying XML Data", Sep. 1999, IEEE Computer Society Technical Committee on Data Engineering, pp. 1-9.

(Continued)

*Primary Examiner* — Michael C Colucci
(74) *Attorney, Agent, or Firm* — Hickman Palermo Becker Bingham LLP

(57) ABSTRACT

A computing system is operable as virtual personal assistant (VPA) to understand relationships between different instances of natural language dialog expressed by different people in a multi-person conversational dialog session. The VPA can develop a common resource, a shared intent, which represents the VPA's semantic understanding of at least a portion of the multi-person dialog experience. The VPA can store and manipulate multiple shared intents, and can alternate between different shared intents as the multi-person conversation unfolds. With the shared intents, the computing system can generate useful action items and present the action items to one or more of the participants in the dialog session.

19 Claims, 7 Drawing Sheets

(56) References Cited

U.S. PATENT DOCUMENTS

| | | | |
|---|---|---|---|
| 9,135,242 B1 | 9/2015 | Wang | |
| 9,269,070 B2* | 2/2016 | Sreenivasan | G06Q 50/01 |
| 9,392,038 B2* | 7/2016 | Robinson | H04L 65/403 |
| 2004/0107413 A1 | 6/2004 | Bixler | |
| 2007/0067398 A1* | 3/2007 | Karmarkar | H04L 51/38 |
| | | | 709/206 |
| 2007/0214097 A1 | 9/2007 | Parsons | |
| 2007/0282805 A1 | 12/2007 | Janzen | |
| 2008/0052203 A1 | 2/2008 | Beyer | |
| 2008/0281927 A1 | 11/2008 | Vanderwende | |
| 2008/0300872 A1 | 12/2008 | Basu | |
| 2009/0086725 A1 | 4/2009 | Lai | |
| 2009/0119173 A1 | 5/2009 | Parsons | |
| 2009/0119368 A1* | 5/2009 | O'Sullivan | G06Q 10/107 |
| | | | 709/204 |
| 2009/0157726 A1 | 6/2009 | Abernethy | |
| 2009/0306979 A1 | 12/2009 | Jaiswal | |
| 2010/0088262 A1 | 4/2010 | Visel | |
| 2010/0205541 A1 | 8/2010 | Rapaport | |
| 2011/0055256 A1* | 3/2011 | Phillips | G10L 15/30 |
| | | | 707/769 |
| 2011/0270678 A1 | 11/2011 | Drummond | |
| 2012/0245925 A1* | 9/2012 | Guha | G06F 17/27 |
| | | | 704/9 |
| 2012/0324027 A1* | 12/2012 | Vaynblat | G06Q 50/01 |
| | | | 709/206 |
| 2013/0006973 A1* | 1/2013 | Caldwell | G06F 17/30719 |
| | | | 707/723 |
| 2013/0024786 A1 | 1/2013 | Dayal | |
| 2013/0143587 A1* | 6/2013 | Williams | H04W 4/023 |
| | | | 455/456.1 |
| 2013/0152092 A1 | 6/2013 | Yadgar | |
| 2013/0325992 A1* | 12/2013 | McGann | H04L 51/046 |
| | | | 709/206 |
| 2013/0339018 A1 | 12/2013 | Scheffer et al. | |
| 2014/0025496 A1* | 1/2014 | Davitz | G06Q 10/00 |
| | | | 705/14.54 |
| 2014/0052680 A1 | 2/2014 | Nitz et al. | |
| 2014/0052681 A1 | 2/2014 | Nitz et al. | |
| 2014/0067535 A1* | 3/2014 | Rezaei | G06F 17/30598 |
| | | | 705/14.54 |
| 2014/0136212 A1* | 5/2014 | Kwon | G10L 15/22 |
| | | | 704/275 |
| 2014/0143013 A1 | 5/2014 | Pavlidis | |
| 2014/0143405 A1* | 5/2014 | Pavlidis | G06Q 30/0202 |
| | | | 709/224 |
| 2014/0156383 A1* | 6/2014 | Vijayaraghavan | |
| | | | G06Q 30/0244 |
| | | | 705/14.43 |
| 2014/0214421 A1* | 7/2014 | Shriberg | G10L 25/51 |
| | | | 704/243 |
| 2015/0193819 A1* | 7/2015 | Chang | G06Q 30/0252 |
| | | | 705/7.19 |

OTHER PUBLICATIONS

Fitchard, Kevin, "Spain's Siri-Challenger Sherpa Learns English, Arrives in the U.S.", Apr. 17, 2013, http://gigaom.com/2013/04/17/spains-siri-challenger-sherpa-learns-english-arrives-in-the-u-s/.

Nitz, et al., U.S. Appl. No. 13/966,665, filed Aug. 14, 2013, entitled "Providing Virtual Personal Assistance With Multiple VPA Applications."

Kalns, et al., U.S. Appl. No. 13/891,858, filed May 10, 2013, entitled "Rapid Development of Virtual Personal Assistant Applications."

Ayan, et al., U.S. Appl. No. 13/866,509, filed Apr. 19, 2013, entitled "Clarifying Natural Language Input Using Targeted Clarification Questions."

Wolverton, et al., U.S. Appl. No. 13/678,209, filed Nov. 15, 2012, entitled "Vehicle Personal Assistant."

Wolverton, et al., U.S. Appl. No. 13/678,213, filed Nov. 15, 2012, entitled "Vehicle Personal Assistant."

Kalns, et al., U.S. Appl. No. 13/891,864, filed May 10, 2013, entitled "Rapid Development of Virtual Personal Assistant Applications."

Wang, "Understanding Computer-Directed Utterances in Multi-User Dialog Systems", May 2013, University of Texas at Dallas.

Hardawar, Devindra, "Searching Without Searching: Expect Labs Taps Nuance for Bold Predictive Computing Tech", Dec. 12, 2012, http://venturebeat.com/2012/12/12/expect-labs-mindmeld-nuance/.

Levy, Ari, "Tim Tuttle's App for Automatic Search", Nov. 8, 2012, http://www.businessweek.com/articles/2012-11-08/tim-tuttles-app-for-automatic-search.

Popper, Ben, "Siri on Steroids: Mindmeld Understands an Eight-Person Conversation", Oct. 4, 2012, http://www.theverge.com/2012/10/4/3448940/expect-labs-mindmeld-google-ventures-greylock-partners.

Kalns, et al. U.S. Appl. No. 13/954,613, "Using Intents to Analyze and Personalize a User's Dialog Experience With a Virtual Personal Assistant," filed Jul. 30, 2013.

Kalns, et al. U.S. Appl. No. 14/092,487, "Sharing Intents to Provide Virtual Assistance in a Multi-Person Dialog," filed Nov. 27, 2013.

http://www.expectlabs.com/technology, accessed Apr. 17, 2014.

http://www.expectlabs.com/about, accessed Apr. 17, 2014.

http://www.expectlabs.com/mindmeld/ (demo video), accessed Apr. 17, 2014.

Scheffer, Nicholas, et al., U.S. Appl. No. 13/333,020, "Method and Apparatus for Generating Speaker-Specific Spoken Passwords," Dec. 21, 2011.

U.S. Appl. No. 14/092,487, filed Nov. 27, 2013, Interiew Summary, dated Aug. 11, 2017.

Kalns, U.S. Appl. No. 14/092,487, filed Nov. 27, 2013, Office Action, dated Oct. 25, 2016.

Kalns, U.S. Appl. No. 14/092,487, filed Nov. 27, 2013, Final Office Action, dated Mar. 15, 2017.

Kalns, U.S. Appl. No. 14/092,487, filed Nov. 27, 2013, Adviosry Action, dated Aug. 5, 2016.

Kalns, U.S. Appl. No. 14/092,487, filed Nov. 27, 2013, Office Action, dated Dec. 27, 2017.

Kalns, U.S. Appl. No. 14/092,487, filed Nov. 27, 2013, Supplemental Notice of Allowability, dated Jun. 1, 2018.

Kalns, U.S. Appl. No. 14/092,487, filed Nov. 27, 2013, Notice of Allowance, dated May 23, 2018.

* cited by examiner

SHARING INTENTS TO PROVIDE VIRTUAL ASSISTANCE IN A MULTI-PERSON DIALOG

BACKGROUND

Computerized systems commonly known as virtual personal assistants ("VPAs") can interact with computing device users in a conversational manner to provide access to electronic information and services. To do this, the VPA needs to be able to correctly interpret conversational user input, execute a task on the user's behalf, determine an appropriate response to the input, and present system output in a way that the user can readily understand and appreciate as being responsive to the input. A complex assortment of software components work together to accomplish these functions.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
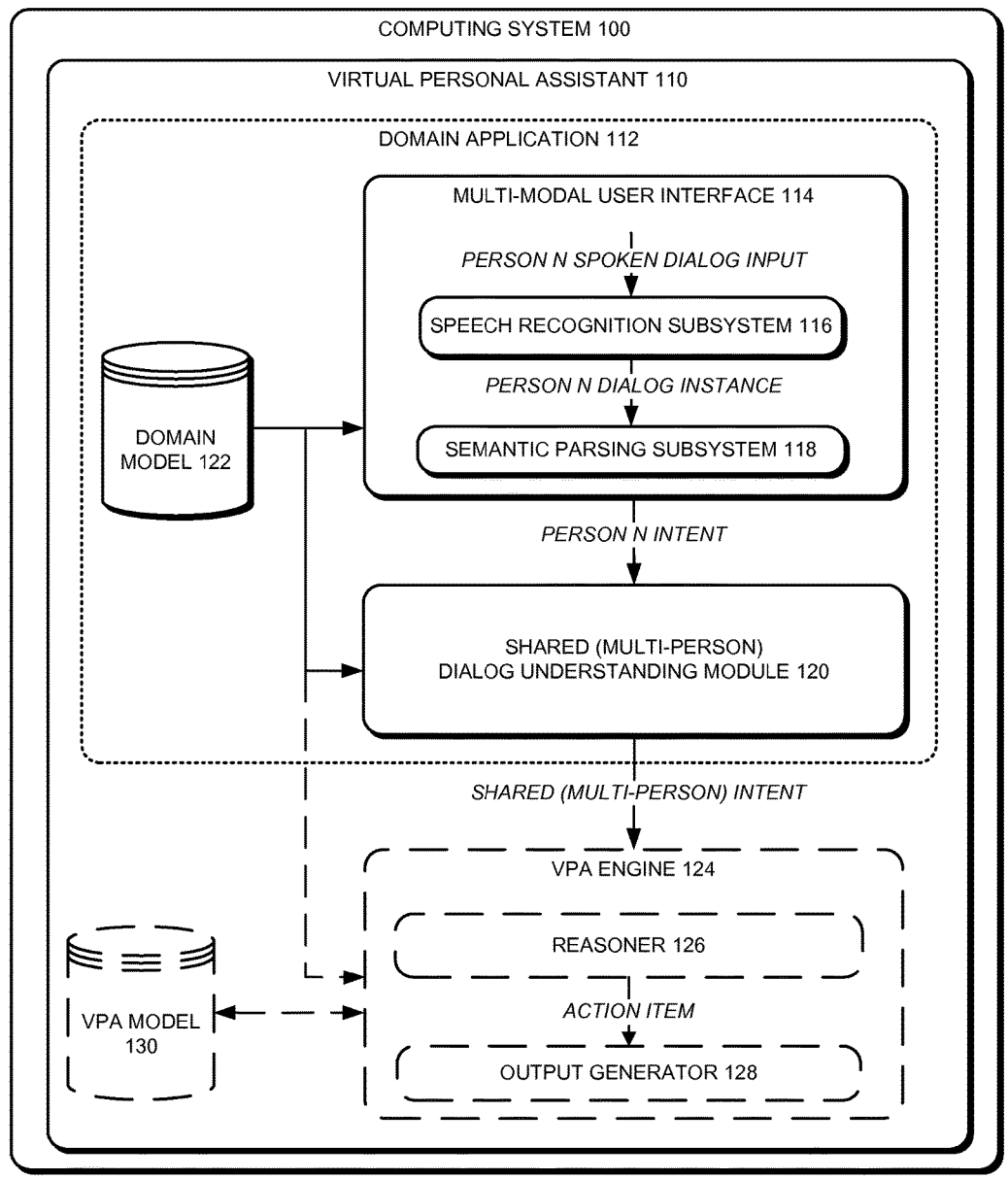
FIG. 1 is a simplified module diagram of at least one embodiment of a virtual personal assistant ("VPA") platform embodied in a computing system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

In single-user virtual assistance systems, a user initiates a request to a computer system through natural language. In doing so, the user may phrase the request differently or more carefully than if the recipient of the request were another person rather than a computer, in order to increase the likelihood that the computer will correctly understand the request. In contrast, conversations between people tend to be much less deliberate, lacking explicit context, and replete with topic changes. Additionally, human to human conversations more frequently contain abstract figures of speech (such as answering questions with questions), non-word verbal expressions (such as "huh" and "ha-ha"), and other rhetorical devices. As such, person to person dialog exchanges are even more challenging for a computing system to interpret accurately than single-user dialog sessions.

Nonetheless, there are situations in which it would be helpful or desirable for a computing system to be able to understand and provide assistance to people involved in multi-person dialog sessions, even if the computing system is simply passively listening rather than a "participant" in the dialog. For example, a group of people may be talking on the phone, meeting in a physical or virtual conference room, riding in a car together, or communicating via an instant messaging or social media service that can receive natural language (e.g., spoken/audio or text/chat) dialog input. Through the course of the conversation a common intention may develop, such as the need to schedule a meeting, plan an event, or update a document (e.g., a to-do list, an agenda, or a project plan). Due to conflicting needs or interests of the participants, or for other reasons, the common intention may evolve over the course of the conversation and may be fully realized only after several rounds of the multi-person natural language dialog, may not be realized at all (e.g., due to disagreement), or may be partially realized (e.g., some action items remain incomplete).

As used herein, "natural language" may refer to, among other things, words, phrases, verbal expressions, and/or combinations thereof, which are formulated by a human, a device, or a system in a fashion that is or is intended to approximate or simulate speech that normally arises in an unpremeditated fashion as the result of the innate facility for language possessed by the human intellect (as distinguished from, for example, structured computer programming languages or code). As used herein, "natural language" includes, among other things, non-word expressions and expressive interjections, such as "uh-huh," "unh-unh," "oh," "uh-oh," and "yay." As used herein, terms such as "dialog" and "conversation" may refer to, among other things, the use of natural language (e.g., spoken or written) in the context of a communicative exchange of information, ideas, opinions, sentiments, observations, questions and answers, statements and responses, or the like, where the communicative exchange involves instances of natural language expressed by different people. In some embodiments, the communicative exchange includes only natural language dialog expressed by the human participants in the conversation (e.g., the computing system passively listens to the conversation). In other embodiments, the communicative exchange may additionally include instances of natural language dialog supplied by one or more computing devices (e.g., as a response to a question or command presented by a human participant in the conversation).

Referring now to FIG. 1, a virtual personal assistant (VPA) 110 is embodied in a computing system 100 as a number of computer applications, modules, executable instructions, and/or data structures, each of which may be implemented in software, hardware, or a combination thereof. As described in more detail below, the illustrative VPA 110 is adapted to, with the permission of the VPA user, follow the user's spoken conversations with other persons and provide virtual assistance during those conversations. The VPA 110 can incorporate information derived from natural language dialog inputs of the other conversation participants into its understanding of the VPA user's dialog, even where the natural language dialog inputs of the other participants are not themselves directly received by the VPA 110. As noted above, in some embodiments, the VPA 110 is configured as a "passive listener" that does not participate verbally in the multi-person dialog, while in other embodiments, the VPA 110 may present natural language output to one or more of the dialog participants from time to time during the multi-person dialog.

A shared (multi-person) dialog understanding module 120 of the VPA 110 develops a semantic understanding of goals, objectives, and/or intentions that two or more of the human participants in the conversation have in common. For ease of discussion, "intention" may be used herein to refer to, among other things, a goal, objective, and/or intention of one or more of the human participants that is expressed or implied by one or more instances of natural language dialog input. As used herein, "intention" includes partially-determined intentions; that is, intentions that are only partially complete, as understood by the VPA 110. As an example, the VPA 110 may determine, by analyzing a multi-person conversation, that the participants would like to meet for lunch next week, but have not decided on the day or location for the lunch meeting. Further, as used herein, "intention" does not necessarily imply that the conversation participants are in agreement as to all of the parameters or attributes of a common goal or objective. For example, the VPA 110 may determine, by analyzing a multi-person conversation, that the conversation participants intend to jointly create a document (such as a to-do list, email announcement, or meeting agenda) but currently disagree as to the contents of the document. The VPA 110 can execute actions based on its understanding of the common or "joint" intentions to, through the computing system 100, provide various forms of useful assistance to the VPA user(s) involved in the multi-person conversation.

The components of the illustrative VPA 110 shown in FIG. 1 are described more fully below. Additionally, various features of virtual personal assistant platforms developed by SRI International are described in a number of other patent applications of SRI International. Such patent applications include, for example, Tur et al., PCT International Application Publication No. WO 2011/028833, entitled "Method and Apparatus for Tailoring Output of an Intelligent Automated Assistant to a User;" Yadgar et al., U.S. patent application Ser. No. 13/314,965, filed Dec. 18, 2011, entitled "Generic Virtual Personal Assistant;" Nitz et al., U.S. patent application Ser. Nos. 13/585,003 and 13/585,008, filed Aug. 14, 2012, both entitled "Method, System, and Device for Inferring a Mobile User's Context and Proactively Providing Assistance;" Wolverton et al., U.S. patent application Ser. Nos. 13/678,209 and 13/678,213, filed Nov. 15, 2012, both entitled "Vehicle Personal Assistant;" Ayan et al., U.S. patent application Ser. No. 13/866,509 filed Apr. 19, 2013, entitled "Clarifying Natural Language Input Using Targeted Clarification Questions;" Kalns, et al., U.S. patent application Ser. Nos. 13/891,858 and 13/891,864, both filed May 10, 2013, both entitled, "Rapid Development of Virtual Personal Assistant Applications;" Kalns et al., U.S. patent application Ser. No. 13/954,613, filed Jul. 30, 2013, entitled "Using Intents to Analyze and Personalize a User's Dialog Experience with a Virtual Personal Assistant;" and Nitz et al., U.S. patent application Ser. No. 13/966,665, filed Aug. 14, 2013, entitled "Providing Virtual Personal Assistance with Multiple VPA Applications," all of which are incorporate herein by reference to provide background information relating to the design, development, operation and use of exemplary virtual personal assistant applications. However, such references are provided for illustration only, and aspects of this disclosure are by no means limited to use in connection with virtual personal assistant platforms developed by SRI International. Rather, the features disclosed herein are applicable to a wide variety of different types of computer systems and devices that enable user-directed spoken natural language dialog as an input modality, including mobile systems such as APPLE SIRI, GOOGLE NOW, and/or others.

Figure 7:
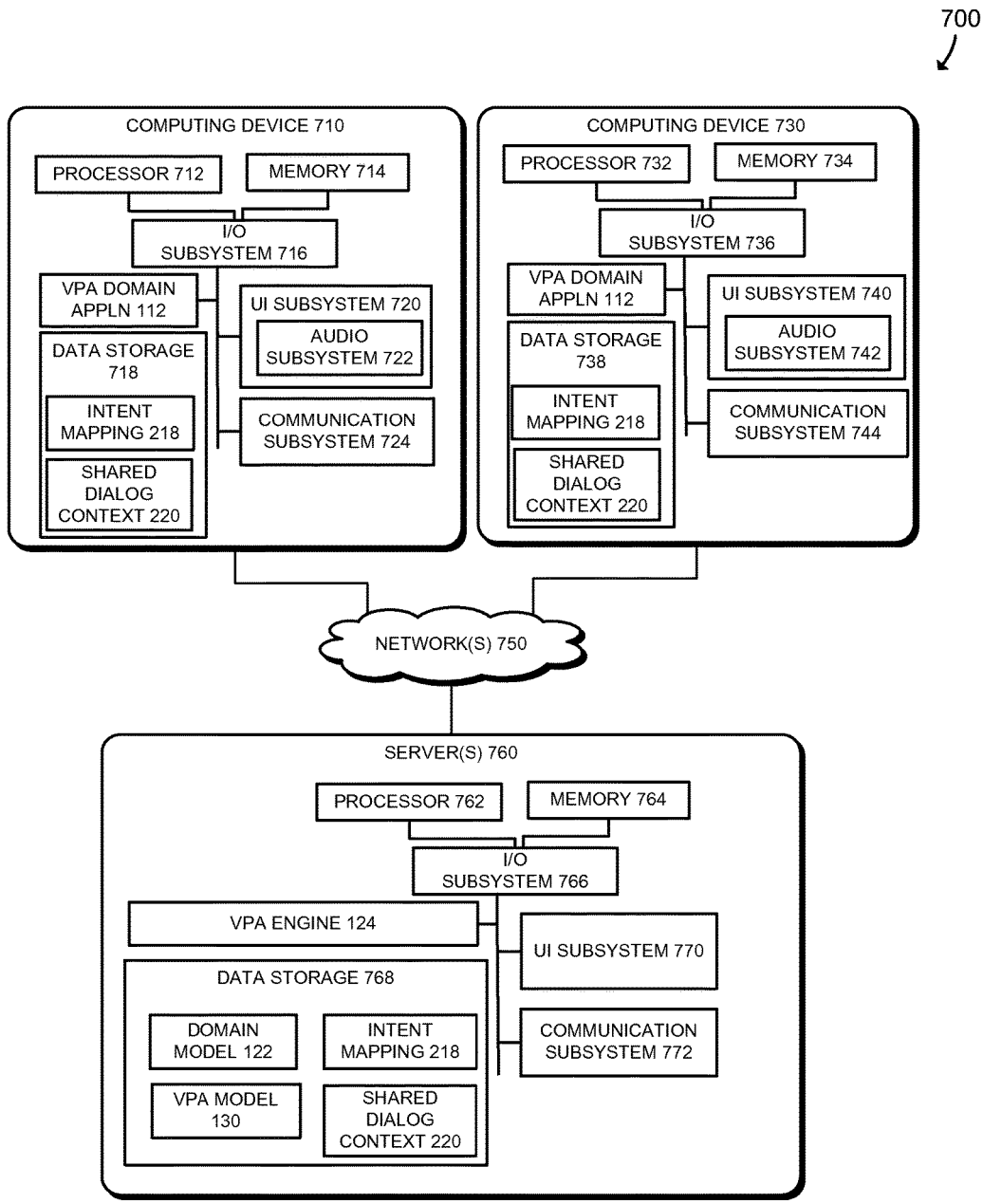
FIG. 7 is a simplified block diagram of at least one embodiment of a hardware environment for the VPA platform of FIG. 1.

As shown in FIG. 1, the illustrative VPA 110 is embodied to include a domain application 112, a domain model 122, a VPA engine 124, and a VPA model 130. The domain application 112 is communicatively coupled to the VPA engine 124. Some embodiments of VPA 110 include multiple domain applications 112 and/or multiple domain models 122 (e.g., to facilitate rapid topic switching). In some embodiments of the VPA 110 (e.g., embodiments in which the VPA 110 simply acts as a passive listener), portions of the VPA engine 124 and its related components may be omitted. In general, the modules and data structures of the VPA 110, and their respective submodules and other computerized components, are in communication with each other as needed by suitable communication mechanisms, which may be enabled by an application programming interface, operating system components, a network communication subsystem, and/or other components of the computing system 100. An exemplary hardware environment for the computing system 100, in which the VPA 110 may be implemented, is shown in FIG. 7, described below.

In operation, the domain application 112 and the VPA engine 124 work together, with assistance from the domain model 122 and the VPA model 130, to enable the computing system 100 to receive, understand, and act upon natural language dialog expressed by different human participants involved in a multi-person conversation. To do this, the illustrative shared dialog understanding module 120 develops a shared dialog context 220 (FIG. 2) over the course of a multi-person conversation in which one or more VPA users are involved. That is, some embodiments of the computing system 100 can operate the VPA 110 where only one of the human participants in a multi-person conversation is using a device operating the VPA 110. In other embodiments, multiple conversation participants may be VPA users having their own devices each operating the VPA 110 or portions thereof.

The shared dialog understanding module 120 leverages the shared dialog context 220 to understand nuances of the multi-person conversation that may reveal a common intention of two or more of the human participants. As described further below, the shared dialog understanding module 120 utilizes the shared dialog context 220 in conjunction with the intent mapping and intent merging techniques disclosed herein to dynamically modify the VPA 110's understanding of the multi-person conversation. As a result, the VPA 110 can detect common intentions that develop over the course of the conversation and refine its understanding of such intentions as the dialog evolves, based on the back-and-forth dialog of the human participants. In this way, the VPA 110 can follow complex multi-person dialog interactions, including conversations in which different conversation participants contribute fragments of information that taken together reveal a common intention. Examples of such conversations include those that involve negotiation, indecision, or disagreement, and conversations in which rapid topic switching takes place.

The semantic understanding of the multi-person dialog interaction developed by the shared dialog understanding module 120 and captured in the shared dialog context 220 contributes to the creation, by the shared dialog understanding module 120, of shared (multi-person) intents. A shared intent contains semantic content relating to a likely common intention, and is developed by the VPA 110 based on portions of information contributed by two or more of the human participants in a conversation. The shared intent can be acted upon by the VPA engine 124. For example, the VPA engine 124 can, without specific instruction from the user, incorporate semantic information from the shared intent into an electronic action item, such as a to-do list, a calendar entry, a message, a notification, an event, a task, a document, and/or another type of useful electronic item. The VPA engine 124 can present the useful electronic item to the VPA user at, for example, a personal or mobile electronic device. In this way, the VPA 110 can, among other things, provide virtual personal assistance to the VPA user in the context of a multi-person dialog involving the VPA user, without requiring the dialog participants to directly address the VPA 110 or otherwise include the VPA 110 in the conversation. Additionally, by creating a shared intent, the VPA 110 can relieve the VPA user of the responsibility of remembering all of the information associated with the discussed common intention (such as agreed-upon event parameters, tasks, list items, and/or other details) and their ultimate resolution (if any) at the conclusion of the dialog.

As used herein, an "intent" may refer to, among other things, a structured representation of semantic content of an instance or multiple instances of natural language dialog input (which may be referred to as a "dialog instance," for ease of discussion), as determined by the VPA 110. As used herein, "semantic content" may refer to, among other things, a semantic meaning of the dialog instance: in other words, the meaning that is likely actually intended by the person submitting the dialog instance, within the context of the on-going dialog, rather than merely the literal meaning of the specific words of the dialog instance that are used to express the person's intention, standing alone, without any context. In some cases, semantic content includes the literal meaning of the words of the dialog instance (e.g., where the VPA 110 has reasoned (using, e.g., artificial intelligence techniques) that the person submitting the dialog instance likely intended a literal meaning. In other cases, semantic content includes a non-literal meaning of the words of the dialog instance (e.g., where the VPA 110 has reasoned, based on multi-modal inputs or dialog context, for example, that the person submitting the dialog instance likely intended a non-literal meaning. As used herein, "a structured representation" may refer to, among other things, a form of input or data that is understandable by a machine (e.g., a computing device). In some embodiments, the intents may be embodied as computer programming constructs and/or data structures, such as databases, tables, programming code (e.g., Java applets), Extensible Mark-up Language ("XML") data structures, and/or others.

In some embodiments, intents are defined as computer programming structures that have a name or label, a list of associated parameters, and data type definitions for each parameter. Additionally, each parameter may be defined to have one or more associated attributes. In some implementations, the intent name or label may correspond to an action that may be performed by the computing system in response to natural language dialog inputs (such as "CreateTaskList") and/or may identify an object that is the subject of or related to an activity (e.g., "TaskItem").

During operation of the VPA 110, intents may be instantiated to include semantically meaningful information or content contained in or relating to an occurrence of natural language dialog input. In some cases, the VPA 110 can understand and process the intents in order to invoke an appropriate electronic service, or to execute some other action to provide assistance to the VPA user in response to the natural language dialog input. Stated another way, an intent may represent, in a structured way, a likely intended goal, objective, or intention of one or more participants in a natural language conversation, where the conversation may involve multiple people and/or computing devices.

Terms such as "goal," "objective," and "intention" may be used herein to convey, among other things, that the VPA 110 seeks to determine not only what the specific words of a conversational natural language input mean, but the speaker's actual intended goal or objective, which he or she used those words to express. As an example, a user might say something like "pick it up tomorrow," which really means that the user's objective is to instruct another human participant in the conversation to buy a product, where the product may have been identified by the user or another conversation participant earlier in the dialog. As another example, the user might say, "Friday is good," which really means that the user is available to attend a meeting on Friday, where the fact that the conversation involves a discussion about scheduling a meeting may have been gleaned by the VPA 110 from natural language dialog inputs offered by other participants earlier in the conversation. Additionally, in creating an intent, the VPA 110 omits extraneous or irrelevant information from the intent. For example, phrases such as "Hey there" or "See you later," or casual dialog about an unrelated topic (e.g., "How about those Niners?") may not result in the creation of an intent, unless the VPA 110 can ascribe a semantic meaning to such inputs, e.g., as a result of other multi-modal inputs (such as detections of facial expressions, voice tone, voice loudness, digital images taken with the camera of the computing system 100, etc.). The VPA 110 can incorporate multi-modal inputs into intents. For example, digital images and other documents can be included in an intent by referencing a file name or data storage location of a captured multi-modal input in a data field of the intent. Alternatively or in addition, the VPA 110 can utilize information extracted from multi-modal inputs to determine the semantic content that is represented by an intent. In some cases, determining the intended goal, objective, or intention of natural language dialog can involve the application of artificial intelligence based methods and systems, such as supervised machine learning techniques.

Intents may be predefined for particular domain applications and may vary significantly from one domain application to another. Accordingly, the domain model 122, described below, may include a number of predefined intents that relate to a given domain application. For example, a scheduling application may include an intent such as "CreateCalendarEvent," while a vacation planning application may include a "PlanTravelItinerary" intent and a grocery shopping application may include a "CreateGroceryList" intent.

In operation, the VPA 110 instantiates the predefined intents in response to occurrences of natural language dialog input (e.g., natural language utterances). That is, the VPA 110 associates data values with specific parameters of predefined intents based on the particular occurrences of natural language dialog input (e.g., by populating the fields of the intent with data values derived from the natural language dialog input). Thus, a natural language dialog may result in the creation of many instances of many different predefined intents. For ease of discussion, the creation of such instances of the predefined intents may be referred to herein simply as "creating an intent," and instances of intents may simply be referred to as "intents." As indicated above, however, it should be appreciated that the intents that are instantiated are, in the illustrative embodiments, predefined computer programming constructs, at least some of which may be specially defined or configured for one or more particular domain applications.

Instances of intents are typically temporally spaced (e.g., they are created sequentially or at different times during a dialog session), as each refers to a different occurrence of natural language dialog input. That is, embodiments of the VPA 110 typically determine one intent for any single occurrence of natural language dialog input. However, particularly in multi-person conversations, a single instance of natural language dialog may cover multiple different topics. In response to a multi-topic instance of natural language dialog input, some embodiments of the VPA 110 may create multiple different intents each corresponding to one of the topics mentioned within the single occurrence of natural language dialog input.

In some embodiments, the VPA 110 may associate a status with an intent. For example, an "initial" intent may refer to an intent that is generated by the semantic parsing subsystem 118, described below. As such, an initial intent may refer to a preliminary formulation of an intent that is created in response to an instance of natural language dialog input, e.g., prior to an instance of natural language dialog supplied by another person, or prior to accessing the shared dialog context 220. A "final" intent may refer to an intent that represents the VPA 110's "best" interpretation of a natural language dialog, after consideration of natural language dialog contributed by one or more other conversation participants, as may be reflected in, for example, the shared dialog context 220. Accordingly, a final intent may refer to an intent that is "actionable," e.g., ready for further processing by the VPA engine 124. In some cases, an intent may be actionable by the VPA 110 even if none or less than all of the data fields are populated with data values derived from the multi-person conversation. For example, a multi-person conversation may be initiated by a VPA user making a phone call to another person to talk about a family vacation. The conversation may end abruptly (e.g., due to one of the participants receiving another phone call). The VPA 110 may nonetheless formulate a "PlanFamilyVacation" intent even though no additional details are available to fill in data fields of the intent. In this case, the VPA 110 (e.g., the reasoner 126) may generate and send an electronic message to the initiator of the intent asking the person for more information about the family vacation plans, or the VPA 110 may know from other information (e.g., profile information, past usage history) that a suitable follow-up action is to contact the person (e.g., by phone or text message) later in the day to engage in a dialog to obtain the missing information.

Whereas a "complete" intent may refer to an intent that specifies both an action and at least one object or other piece of information relating to the action (e.g., PlanVacation), a "partial" intent or "fragment" may refer to dialog input that is only partially understood by the VPA 110, or which forms only a portion of a common intention. As such, a partial intent may provide a structured representation of an action (e.g., "Plan") without a corresponding object or other information, or may provide a structured representation of an object or other piece of information (e.g., "Date") without a corresponding action. For example, the user may simply say, "Can you make it tomorrow?" or "August is good for us." The dialog input appears to contain important, but incomplete information. As a result, the VPA 110 may preserve such information in a partial intent and then try to resolve the partial intent at a later time, after consideration of dialog input provided by another person involved in the conversation (e.g., by referring to the shared dialog context 220 as described below). In the "can you make it tomorrow?" example, the VPA 110 may not know, without reference to the shared dialog context 220 or until later in the conversation, who "you" is, to what "it" refers, or whether the person referred to as "you" respond has responded to the question in the affirmative. However, the dialog input contains potentially important information in that it is a question asked by one of the conversation participants, and the question contains a potentially important data value (tomorrow). Thus, the VPA 110 may formulate an intent such as Question(speaker_ID, you, it, tomorrow) to represent the potentially important semantic content presented by the dialog input. Similarly, in the "August is good for us" example, the VPA 110 may formulate a partial intent such as PreferredDate(speaker_ID, August, good), and then later combine the partial intent with an intent generated from another person's dialog input (e.g., another partial intent, or a complete intent).

As described further below, the VPA 110 can combine multiple different types of intents to create a shared intent. For example, the VPA 110 can combine a complete intent initiated by one conversation participant with a later-determined partial intent initiated by another conversation participant, or the VPA can combine a partial intent initiated by one conversation participant with a later-determined complete intent initiated by another conversation participant, or the VPA 110 can combine multiple different partial intents initiated by multiple different conversation participants at various times to create a complete intent.

As the domain application 112 is designed to provide assistance during a conversation involving multiple human participants, the intents may be specifically designed to track the identity of the various speakers of the natural language dialog inputs, and the different data values offered by the different speakers. For example, as shown above, a PreferredDate intent may be designed to include a data field in which to store a unique identifier ("ID") that is associated with the speaker of an instance of natural language dialog input (e.g., a user ID, session ID, device ID or network address). Additionally, the "date" data field may be defined as a data structure that can hold multiple different values (such as an array). Thus, if another speaker in the conversation responds that "July is better for us," the PreferredDate intent can retain the data values indicating the preferences of the multiple speakers, e.g.: PreferredDate ([speaker1:August], [speaker2:July]).

Referring further to FIG. 1, the illustrative domain application 112 includes a multi-modal user interface 114. Through the multi-modal user interface 114, the VPA 110 can receive and utilize a number of different forms of input, including natural language dialog inputs from a number "N" of different persons participating in a conversation (where "N" is any positive integer). For example, where the participants in the conversation are in close proximity (e.g., located in the same vehicle or room of a building), the multi-modal user interface 114 may receive the natural language dialog inputs and/or other multi-modal inputs (e.g., facial expressions, lip movements, etc.) of the multiple participants by one or more multidirectional microphones and/or cameras of the computing system 100, which are positioned in the vicinity of the participants. Where one or more of the conversation participants are connected to the VPA 110 remotely (e.g., by telephone or an electronic messaging service, or by another VPA client application that is local to a participant's personal computing device), the multi-modal user interface 114 may receive the natural language inputs and/or other multi-modal inputs of the remotely-connected participant by, for example, a network interface provided by a communication subsystem of the computing system 100.

Other forms of input that may be received by the multi-modal user interface 114 include: non-dialog human-generated inputs (e.g., non-dialog keyboard, keypad, or touch screen inputs, mouse clicks, gestures, facial expressions, eye focus, pupil dilation, voice tone, voice loudness, and/or others), computer application inputs (e.g., data and/or instructions passed by another computer application, program, or process to the VPA 110, through an application programming interface, for example), and sensor inputs (e.g., electrical signals embodying sensed or otherwise detected information about the user's physical features or local environment, such as geographic location, motion, temperature, activity, biometric data, etc.).

As noted above, the multi-modal user interface 114 can capture or receive spoken natural language dialog input by a microphone or other audio input device of the computing system 100. Alternatively or in addition, the multi-modal user interface 114 can capture or receive text-based natural language dialog input by, for example, a network communication subsystem of the computing system 100 or a user interface subsystem of the computing system 100 (which may include, for example, a touch pad, key pad, or touch screen user input device). In some cases, the multi-modal user interface 114 may capture or receive data relating to "off-device" body movements or other gesture-type inputs (such as hand waves, head nods, eye movements, etc.) by, e.g., a camera, motion sensor and/or kinetic sensor, which may be integrated with or otherwise in communication with the computing system 100. In any event, the captured or received inputs are at least temporarily stored in memory of the computing system 100. While the VPA 110 is often mainly concerned with processing natural language dialog inputs, other forms of inputs may be used by the VPA 110 to aid in its understanding of the natural language dialog inputs, to determine a suitable response to the natural language dialog inputs, or for other reasons. The VPA 110 can use multi-modal inputs such as voice tone, voice loudness, speaking pace, and/or facial expression to aid in its interpretation of expressive interjections, including non-word expressions. For example, expressions such as "ok" and "uh-huh" could indicate approval, skepticism, or uncertainty, depending on the manner in which they are spoken and/or the accompanying gestures or facial expressions. The VPA 110 may incorporate multi-modal inputs into the creation of intents to improve the VPA 110's understanding of the semantic meaning of such expressions as well as the semantic meaning of the dialog.

The illustrative multi-modal user interface 114 includes a speech recognition subsystem 116 and a semantic parsing subsystem 118. In the case of spoken natural language inputs, the speech recognition subsystem 116 processes the captured or received natural language speech (audio) and generates a machine-readable version of the speech that can be further analyzed by the semantic parsing subsystem 118. The speech recognition subsystem 116 applies acoustic and/or language models to recognize spoken words and/or phrases in the spoken natural language dialog inputs, and converts the audio into a machine-readable form (e.g., text, which may include words, word strings, phrases, sentences, or other forms of verbal expression). There are many suitable automated speech recognition (ASR) systems that are commercially available; one example is the DYNASPEAK system, available from SRI International. While the speech recognition subsystem 116 is shown in FIG. 1 as a component of the multi-modal user interface 114, in other embodiments, the speech recognition subsystem 116 may be a separate or external (e.g. third party) component with which the VPA 110 is communicatively coupled.

In some embodiments, the multi-modal user interface 114 may additionally include a "normalizer." The normalizer may pre-process the output of the speech recognition subsystem 116 in advance of the semantic parsing subsystem 118. The normalizer may apply pre-defined rules or templates to identify and label certain types of data elements contained in the output of the speech recognition subsystem 116. For example, the normalizer may recognize dates, titles, street addresses, units of measure, currency units, or nicknames and label them as such. For example, the normalizer may resolve "dozen donuts" to "12 donuts" or "ten bucks" to "$10." In some cases, features of the normalizer may be incorporated into the semantic parsing subsystem 118.

The speech recognition subsystem 116 communicates the machine-readable instances of natural language dialog that correspond to the human-supplied natural language dialog inputs initially received by the speech recognition subsystem 116 to the semantic parsing subsystem 118. The semantic parsing subsystem 118 analyzes the words and/or phrases produced by the speech recognition subsystem 116 and/or the normalizer and determines a semantic meaning most likely intended by the user given, for example, other words or phrases presented by the user during the natural language dialog. The semantic parsing subsystem 118 may apply artificial intelligence-based natural language processing techniques. For instance, the semantic parsing subsystem 118 may utilize a statistical parser to determine, based on the verbal context, the likely intended meaning of words or phrases that have multiple possible interpretations. Alternatively or in addition, a rule-based parser may be used. A rule-based parser maps portions of the natural language dialog input to predefined natural language templates or grammars, while a statistical parser uses statistical classifiers developed based on training data to arrive at the likely intended or semantic meaning of the words and phrases in a natural language dialog instance. A hybrid parser may arbitrate between the outputs of the rule-based parser and the statistical parser to determine which of the outputs is more likely to represent the user's intended meaning.

As an example, in a dialog session, the word "pop" could mean that something has broken, may refer to a carbonated beverage, or may be the nickname of a person, depending on the verbal context, including the surrounding words and/or phrases of the current dialog input, previous rounds of dialog, and/or other multi-modal inputs. The semantic parsing subsystem 118 determines which of the possible meanings is most likely to be correct, in view of the known context information. In some embodiments, a natural language understanding system, such as the SRI Language Modeling Toolkit, available from SRI International, may be used in connection with the semantic parsing subsystem 118. The semantic parsing subsystem 118 generates an initial intent by mapping the parser output to the predefined intents, which are contained in the domain model 122 and/or the VPA model 130.

The domain model 122 and the VPA model 130 are each embodied to include a knowledge base of components that enable the VPA 110 to understand, reason about (using, e.g., artificial intelligence techniques), and respond to the natural language dialog inputs that it receives. As such, the domain model 122 and the VPA model 130 may include information, data structures, computer program logic or other executable components, or a combination thereof. Components of the domain model 122 and the VPA model 130 may be embodied as rules, templates, data, arguments, parameters, and/or computer code. In some embodiments, the components of the domain model 122 and the VPA model 130 include predefined grammars, intents, task flows, and natural language response templates. Each or any of these components may be domain-specific, while other components may be considered domain-independent or "generic."

As used herein, the term "domain" may refer to, among other things, a category of information and/or activities in relation to which the VPA 110 may provide assistance in regard to a multi-person natural language dialog session. In some cases, "domain" may refer to the scope of a particular VPA application to which the VPA 110 is directed, or to a portion thereof. For example, one VPA application may be directed specifically to planning a family vacation at DisneyWorld, while another VPA application may be more broadly directed to planning any type of vacation. Still other VPA applications may be designed specifically for use in an automobile (e.g., as a driver's assistant), for use in connection with a particular task (e.g., grocery shopping), for general-purpose use, or for any number of other more specific or more generalized applications. The domain model 122 is adapted according to the scope and requirements of the particular domain application 112, while VPA model 130 contains the more general purpose or "generic" VPA components that are applicable across domains.

As described in more detail below, the initial intent prepared by the semantic parsing subsystem 118 is analyzed by the shared dialog understanding module 120 in view of the shared dialog context 220. As a result of its analysis and processing, the shared dialog understanding module 120 develops a "final" shared intent, which is processed by the VPA engine 124. A reasoner 126 of the VPA engine 124 synthesizes the "final" shared intent in view of applicable business logic, rules, etc., which may be supplied by the domain model 122 and/or the VPA model 130. From this analysis, the reasoner 126 determines a likely appropriate task flow or "work flow" to execute and/or a likely appropriate system response to the shared intent (where "likely appropriate" may refer to a computed statistical measure of confidence determined and/or evaluated by the reasoner 126). Such task flows or work flows may be predefined, e.g., based on the requirements of a particular domain application, and stored in the domain model 122 or the VPA model 130. In some cases, the likely appropriate system task may be to execute an action on the computing system 100, whereas in other cases, an appropriate system task or response may be for the VPA 110 to follow up on the multi-person conversation in order to elicit additional inputs from one or more of the conversation participants that may help the VPA engine 124 perform a subsequent action item. In some embodiments, the reasoner 126 may apply rules for determining when a multi-user conversation has ended, so as to determine an appropriate time for the VPA to initiate one or more action items. Such rules may be predefined for a particular domain application and stored in, for example, the domain model 122 or the VPA model 130.

At an appropriate time (e.g., upon conclusion of the multi-person dialog), the reasoner 126 communicates with an output generator 128 of the VPA engine 124 to present appropriate output to the VPA user. In general, the output generator 128 generates the type of system output that the reasoner 126 determines (e.g., based on a high degree of statistical confidence) is likely appropriate based on the shared intent and/or other factors. For example, if the shared intent is CreateToDoList, the system output may include an audio or visual presentation by the computing system 100 of a task list that the user can approve to be saved to his or her local computing device or communicated to another electronic device. In embodiments in which other conversation participants may be connected to the VPA 110 (e.g., by a network), the output generator 128 may generate system output that is applicable to such other participants and provide the output to the participants' local electronic devices via a network connection. In some embodiments, the output generator 128 may provide system output to another software application using, e.g., applicable application programming interfaces and/or other computer programming devices. For example, the output generator 128 may provide or make available system output to social media applications, search engines, messaging systems, and/or other computer applications.

In some embodiments, the output generator 128 may include a natural language generator (NLG) module, which may be used to generate a natural language version of the system-generated output. A speech synthesizer or text-to-speech (TTS) module may be used to convert natural-language text generated by the natural-language generator to speech output (e.g., machine-produced speech using a human or humanlike voice). The speech output may be played through a speaker of the computing system 100. Alternatively or additionally, the output generator 128 may present visual material (e.g., text, graphics, or video), tactile notifications, and/or other forms of output, which may be presented at, for example, one or more local computing devices of the computing system 100.

Other embodiments of the VPA 110 may include additional components or modules not mentioned herein, such as additional domain-specific VPA components. For example, some embodiments of the VPA 110 may include multiple different domain models 122 and a mechanism for determining, based on the received natural language dialog input, which domain model 122 to apply to the input. For instance, in a multi-person conversation, the multiple speakers in the conversation my alternate back and forth between different intents (e.g., selecting flights or selecting theme parks, for a vacation). The intents relating to "flight reservations" may be contained in a different dialog model than the intents relating to "theme parks." Accordingly, the VPA 110 accesses the relevant dialog model based on the currently received input. Some examples of systems in which different domain models may be accessed in response to changes in the conversation topic are described in U.S. Pat. Nos. 7,016,849 and 7,013,275 of SRI International. Additionally, some components described herein as being embodied as part of the VPA 110, the domain application 112, or the VPA engine 124 may be incorporated into other parts of the VPA 110 or may be external to the VPA 110 and accessed by the computing system 100 over a communication network, in other embodiments.

Figure 2:
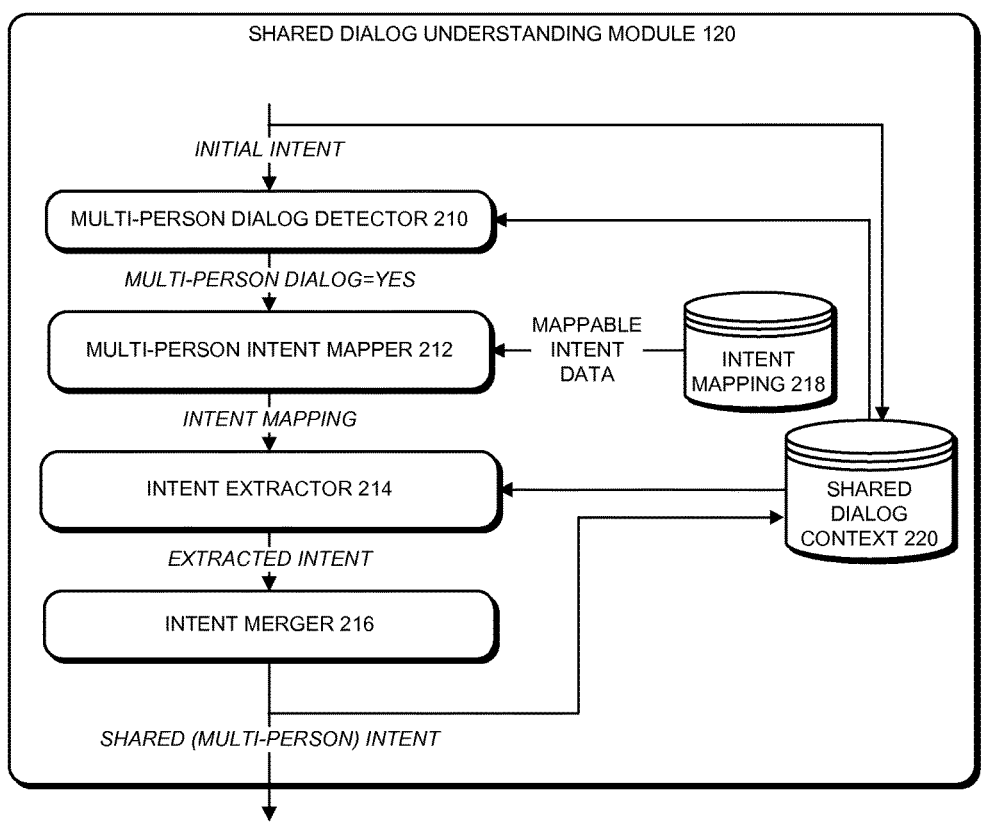
FIG. 2 is a simplified module diagram of at least one embodiment of the shared dialog understanding module of FIG. 1.

Referring now to FIG. 2, the illustrative shared dialog understanding module 120 is embodied as a number of computerized modules and data structures including a multi-person dialog detector 210, a multi-person intent mapper 212, an intent extractor 214, and an intent merger 216, as well as the shared dialog context 220 and an intent mapping 218. The multi-person dialog detector 210 detects the initiation of a natural language dialog session involving multiple human participants, where at least one of the human participants is a user of the VPA 110. To do this, the multi-person dialog detector 210 may simply detect the user's explicit activation of the VPA 110. For example, the VPA user may tap a physical or virtual button on a local computing device or speak a particular command or phrase into a microphone of the computing system 100, in order to activate the multi-person dialog understanding features of the VPA 110. The multi-person dialog understanding features of the VPA 110 may, alternatively, be activated implicitly by the multi-person dialog detector 210. For example, the VPA 110 may be activated upon the receipt of a telephone call at the user's mobile device.

Further, in some embodiments, the VPA 110 may be configured to provide more traditional single-user VPA features as an alternative to the multi-person dialog understanding features described herein. In those cases, the multi-person dialog detector 210 may determine whether the current dialog session involves multiple human participants upon receipt of an initial intent from the semantic parsing subsystem 118. To do this, the multi-person dialog detector 210 may access the shared dialog context 220 to determine whether the shared dialog context 220 contains any intents that have been specially configured for multi-person dialog scenarios (e.g., intents that contain a data field for a "user ID"). Thus, in some embodiments, the VPA 110 is adaptable to switch back and forth between a single-user mode and a multi-person dialog tracking mode.

The shared dialog context 220 is created and updated by the VPA 110 over the course of each multi-person natural language dialog session. The VPA 110, e.g., the semantic parsing subsystem 118, adds initial intents to the shared dialog context 220 as they are created or updated in response to new dialog input. Similarly, the VPA 110, e.g., the shared dialog understanding module 120, adds shared intents to the shared dialog context 220 as they are created or updated in response to new dialog input. Accordingly, the shared dialog context 220 contains a historical record of intents that are created by the VPA 110 during a multi-person dialog session. The shared dialog context 220 persists in memory as long as needed by the dialog participants or as long as needed by the VPA 110. As described in the aforementioned Kalns et al., U.S. patent application Ser. No. 13/954,613, such an intent history contains semantic information about the dialog that in many cases is not apparent from the "raw" instances of natural language dialog input. In embodiments in which the VPA 110 handles natural language dialog inputs from multiple human participants, the VPA 110 updates the shared dialog context 220 with intents that are derived from the dialog instances of each of the multiple participants. In other embodiments, the shared dialog context 220 may be accessed and updated by different VPA applications or other dialog-enabled software applications that are used by the various conversation participants. Portions of the shared dialog context 220 may be stored in persistent data storage, e.g., for use in connection with a future multi-person dialog session. As such, portions of the shared dialog context 220 may be embodied as temporary and/or persistent data structures as needed, including, e.g., a stack, queue, database, file, table, and/or other type of data structure. Retaining portions of the shared dialog context 220 after a current dialog session has ended may be useful to, for instance, allow the conversation participants to pick up a conversation where they had previously left off, with the VPA 110 able to recall and provide details that have already been discussed and decided in the earlier conversation.

While the illustrative shared dialog context 220 is described above as being created and maintained by the VPA 110, it should be understood that the shared dialog context 220 may comprise a number of different data structures, which may be stored in different locations and collectively form the shared context. For example, where the multi-person conversation involves multiple VPA users, each VPA 110 may store its user's dialog context separately and then allow other VPAs to access the user-specific dialog context. Alternatively, the VPA 110 may include a mechanism to periodically poll each user-specific dialog context and copy or transfer updated information from the individual dialog contexts to a "global" data structure that can be accessed by all of the VPAs that are observing the multi-person dialog session. In other words, references to a "shared dialog context" are not meant to imply that a unitary, shared storage mechanism is required, although some embodiments may utilize such an architecture.

To interpret an initial intent, the multi-person intent mapper 212 analyzes the components of the initial intent and determines one or more other intents with which the initial intent or portions thereof may be combined by the intent merger 216, described below. The multi-person intent mapper 212 accesses the intent mapping 218 to identify components of the initial intent that correspond to components of other intents.

The intent mapping 218 may be implemented as one or more database tables or other suitable data structures that defines relationships or associations between the various intents and their respective components. Illustratively, such relationships or associations are based on whether the intents or any of their respective components have any features in common. For example, if two different intents relate to the same type of action or object, the intent mapping 218 may indicate that one or more of the data values of one of the intents may be incorporated into corresponding data fields of the other intent or vice versa. As another example, if two different intents have parameters that are defined as the same data type, the intent mapping 218 may indicate that data values associated with those parameters can be combined. Table 1 below illustrates some exemplary intents and their respective mappable components.

TABLE 1

Intent components.

| Intent Name | Parameters | Data Values | Data Types |
| --- | --- | --- | --- |
| PlanFamilyVacation | Destination | DisneyWorld | String |
| | Attendees | Jane's family, Bob's family, Susan's family | Array, string |
| | Desired Parks | Magic Kingdom | Array, string |
| | Date Range | 6/15-9/1 8/1-9/1 | Array, date |
| GetInterest | Attendees | Susan's family | String |
| | Desired Parks | Magic Kingdom | String |
| GetDateRange | Attendees | Bob's family Jane's family | String |
| | Date Range | 6/16-9/1 8/1-9/1 | Date |

As shown in Table 1, the illustrative structure of an intent includes an intent name, a number of parameter names, and data types associated with each parameter. When instantiated as a result of the receipt of natural language dialog input by the VPA 110, the instance of the intent corresponding to the received dialog input is populated with one or more data values. The intent mapping 218 may define any of the components shown in Table 1, and/or any other components of an intent, as a mappable component. In other words, any suitable criteria may be used to determine whether, during a multi-user dialog session, different intents or instances of intents can or should be combined to create a shared intent. Table 2 below illustrates some examples of intent mappings that may be defined in the intent mapping 218.

TABLE 2

Intent mapping.

| Intent | Mappable Components of Intent | Mapped Intent | Mappable Component(s) of Mapped Intent |
|---|---|---|---|
| CreateCalendarEvent | Location Date Subject | DateAndLocation | MyLocation MyDate MyLocation, MyDate |
| CreateCalendarEvent | AttendeeName | PersonName | FirstName, LastName |
| PickUpGroceries | GroceryList | GroceryItem | ItemName, ItemQty |

In the example of Table 2, parameters of a DateAndLocation intent map to corresponding parameters of a CreateCalendarEvent intent. Mappable components of one intent can be defined in the intent mapping 218 to map to one or multiple mappable components of another intent, and even if the mappable components are not the same. For example, in Table 2, the MyLocation and MyDate parameters of the DateAndLocation intent both map to the Subject parameter of the CreateCalendarEvent intent. Thus, according to the intent mapping of Table 2, the Subject field of the CreateCalendarEvent can be populated with date and/or location data values that are present in an instance of the DateAndLocation intent. As an example, in a multi-person dialog session, if a speaker 1 begins by talking about a meeting and then a speaker 2 says, "tomorrow is good" or "I'll be at my home office," the "tomorrow" or "home office" information provided by speaker 2 can be captured in the DateandLocation intent and then incorporated into an earlier or later-created CreateCalendarEvent intent derived from speaker 1's dialog input. Similarly, if a speaker 3 then says, "Jim should attend," the "Jim" information provided by speaker 3 can be captured by the PersonName intent and incorporated into the earlier- or later-created CreateCalendarEvent intent that includes details provided by speaker 1 and speaker 2. In a grocery shopping application, grocery item details suggested by a first speaker, such as item name and quantity, can be captured by a GroceryItem intent and then incorporated into a GroceryList data field of a PickUpGroceries intent that is derived from dialog input of a second speaker.

With the mappable component and mappable intent information obtained from the intent mapping 218 for the initial intent, the intent extractor 214 executes computer logic (e.g., a search algorithm or query) to search the shared dialog context 220 for one or more instances of potentially mappable intents. The intent extractor 214 may use any suitable search criteria to identify and select potentially suitable instances of mappable intents in the shared dialog context 220. For example, the intent extractor 214 may select an intent instance from the shared dialog context 220 based on whether the intent name matches the name of the initial intent, the number of common mappable components, the temporal proximity of the intent instance in relation to the occurrence of the initial intent, the speaker associated with the potentially mappable intent instance in comparison to the speaker associated with the initial intent, pre-defined priority values or weighting criteria, and/or other factors. The intent extractor 214 may select one or a number of mappable intent instances from the shared dialog context 220 based on any combination of such criteria. If more than one mappable intent is found, embodiments of the intent extractor 214 select the most recently created or updated intent in the shared dialog context 220. Other embodiments may use other criteria for selecting a mappable intent from a set of mappable intents. Further, the VPA 110 may override the current intent criteria as needed, according to the requirements of a particular design or version of the VPA 110.

Once the intent extractor 214 identifies one or more intents in the shared dialog context 220 that satisfy the applicable mapping criteria, the intent extractor 214 extracts each of the selected intents from the shared dialog context 220 and retains the selected intent(s) at least temporarily (e.g., in cache memory). As used herein, "extract" refers to an information extraction process, which may involve, for example, programmatically making a copy of a selected intent or at least the mappable portions thereof. However, in some embodiments, the extracted intent may actually be removed from the shared dialog context 220 by the intent extractor 214, so that the VPA 110 does not attempt to re-map the extracted intent to another intent, or for other reasons. The intent extractor 214 passes each extracted intent to the intent merger 216.

Figure 5:
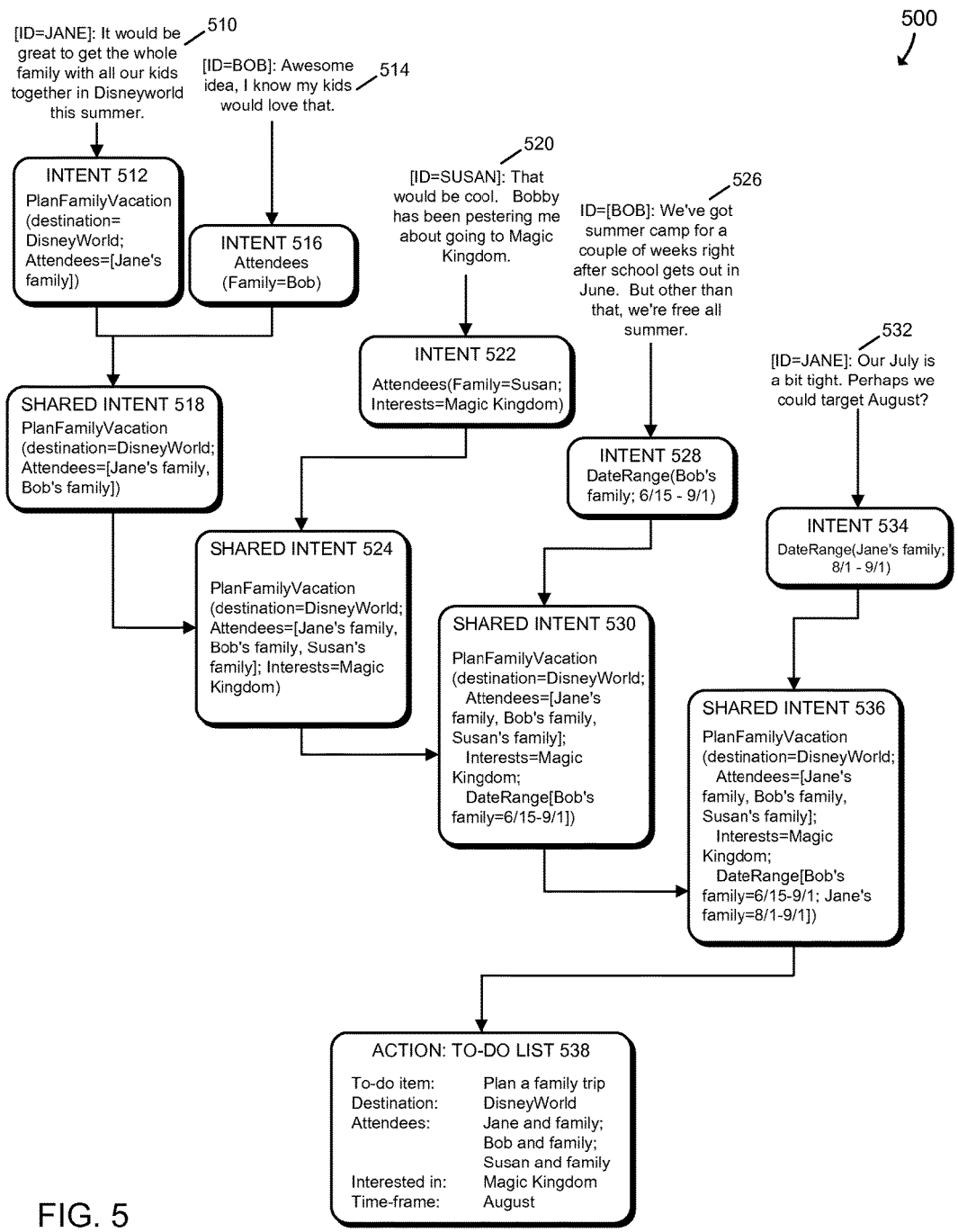
FIG. 5 is a simplified flow diagram illustrating an example of intent sharing by at least one embodiment of the computing system of FIG. 1 to create an action item from a multi-person dialog.

The intent merger 216 combines or "merges" the extracted intent with the initial intent to create a new version of either the initial intent or the extracted intent, or an entirely new intent, based on the intent mapping 218. To do this, the intent merger 216 appends or overwrites one or more data values of one of the intents with one or more data values of the other intent, and stores the updated intent as a new version of one of the merged intents or as a new intent. For example, where a parameter of one intent has a data type that permits the retention of multiple data values in a data field, the data values of another intent may be appended without replacing the existing data values in the data field. In other cases, a data value of one intent may simply be replaced with a data value of another intent. In the example of FIG. 5, described below, the illustrative "Attendees" data field is additive, appending new data values as they are expressed by different persons in the conversation. In contrast, data in the "DateRange" data field may be replaced as new constraints (e.g., data value conflicts) are learned from the dialog. Replacing data values with other data values learned at other points in the conversation may be desirable if, for example, one of the data values provides a greater amount of detail than another data value (e.g., the specific name of a restaurant as opposed to "that French place"), or if through the course of the dialog session it appears that the participants have agreed on a particular data value. In any event, the resulting combination of the initial intent and the extracted intent is used to create a final intent, which is stored in the shared dialog context 220. Upon conclusion of the multi-person conversation (or upon the VPA 110's determination that the portion of the conversation relating to the topic of the final intent has concluded), the final intent may be passed by the intent merger 216 to the VPA engine 124 as the shared intent.

Figure 3:
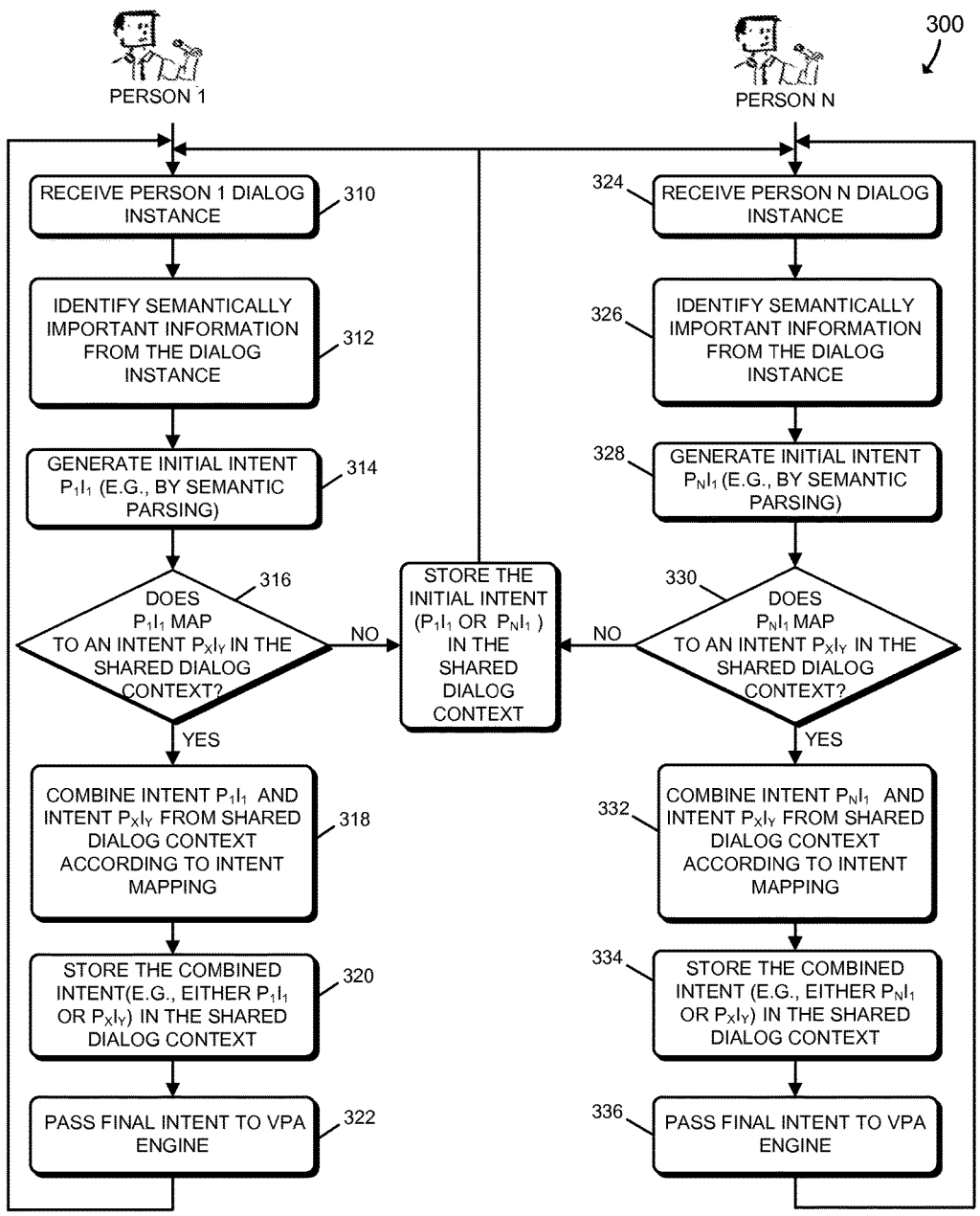
FIG. 3 is a simplified flow diagram of at least one embodiment of a method for generating and sharing intents in a multi-person dialog session with the computing system of FIG. 1.

Referring now to FIG. 3, a flow diagram provides an illustration of a process by which embodiments of the VPA 110 may create a shared understanding of a multi-person natural language dialog session 300. In FIG. 3, a person 1 and a person N are involved in a natural language conversation. The conversation may involve any number of human participants, and FIG. 3 shows two persons only for simplicity of illustration. Each of the persons 1 and N offers conversational natural language dialog input from time to time during the dialog session 300. As described above, the conversational natural language dialog input of the multiple participants may be received and initially processed by separate computing devices, each of which may include some portions of the VPA 110. For example, in some embodiments, the natural language dialog inputs of the participants may be initially received and processed by separate speech recognition subsystems 116 and/or semantic parsing subsystems 118, and the resulting initial intents coordinated by the shared dialog understanding module 120. In other embodiments, the natural language dialog inputs of the multiple participants may be received and handled by a unitary VPA 110 (e.g., without the need for separate speech recognition and/or semantic parsing components).

In the illustrative embodiment, each person's natural language dialog inputs are handled by the VPA 110 in a similar manner. That is the processes performed at blocks 324, 326, 328, 330, 332, 334, 336 substantially mirror the processes performed at blocks 310, 312, 314, 316, 318, 320, 322, respectively. However, the illustration is not meant to suggest that such processes need to occur at the same time as their respective counterparts. Rather, the processes illustrated by the blocks shown in FIG. 3 may occur at any time or at different times, relative to their counterparts for other conversation participants, during the dialog session 300. At block 310 or 324, the computing system 100 receives an instance of natural language dialog input from Person 1 or Person N, as the case may be. As noted above, such input may be captured by, for example, a multi-directional microphone of the computing system 100. At block 312 or block 326, the computing system 100 analyzes the received instance of natural language dialog, converts it to machine-readable form as needed, and, in some cases, may identify or tag useful information contained in the dialog instance. To do this, the system 100 may engage the speech recognition subsystem 116 and/or a normalizer as described above. At block 314 or 328, the system 100 generates an initial intent corresponding to each person's instance of natural language dialog input. Thus, block 314 creates an initial intent $P_1I_1$ corresponding to the dialog instance received at block 310, and block 328 creates an initial intent $P_NI_1$ corresponding to the dialog instance received at block 324. To create the initial intents, the system 100 may engage the semantic parsing subsystem 118 described above.

At block 316 or block 330, the system 100 checks the shared dialog context 220 to try to obtain from the shared dialog context 220 a mappable intent; that is, an intent that may be combined with the initial intent to improve upon the system 100's current understanding of the multi-person conversation. Mappable intents may be identified based on the intent mapping 218, as described above. If the system 100 is unable to find a mappable intent in the shared dialog context 220 (as may be the case if, for example, the dialog instance is the first instance in the dialog session), the system 100 adds the initial intent ($P_1I_1$ and/or $P_NI_1$, as the case may be) to the shared dialog context 220.

If the system 100 finds an intent, $P_XI_Y$, in the shared dialog context 220 with which to combine the initial intent, then at block 318 or 332, the system 100 combines or merges the initial intent ($P_1I_1$ and/or $P_NI_1$, as the case may be) with the found intent $P_XI_Y$, or vice versa. While the reference $P_XI_Y$ is used to denote an intent that is extracted from the shared dialog context 220, it should be understood that each of the initial intents $P_1I_1$ and $P_NI_1$ may be mapped to and combined with different intents extracted from the shared dialog context 220. In other words, different intents of different persons involved in the multi-person dialog session may be combined with different intents from the shared dialog context. On the other hand, the intents of different conversation participants may be combined with the same intent $P_XI_Y$, in some situations. This may be the case where, for example, each of the initial intents $P_1I_1$ and $P_NI_1$ represents a partial intent or fragment, and both of the initial intents $P_1I_1$ and $P_NI_1$ map to a more well-defined intent, $P_XI_Y$, such that data values from both of the partial intents should be merged into the more well-defined intent extracted from the shared dialog context 220. For instance, the intent $P_1I_1$ may include a data value indicating a suggested time for a meeting (without mentioning the meeting), the intent $P_NI_1$ may include a data value indicating a suggested location for the meeting (without mentioning the meeting), and $P_XI_Y$ may include data values defining the meeting topic, attendees, and date. Additionally, it should be noted that while the illustrative VPA 110 is primarily concerned with creating shared intents that result from the combination of initial intents of different persons, the system 100 can use the same methods and techniques to combine intents that are derived from different dialog instances of the same person.

At block 320 or 334, the system 100 stores the combined intent(s) in the shared dialog context 220 (e.g., $P_1I_1+P_XI_Y$ or $P_XI_Y+P_1I_1$, $P_NI_1+P_XI_Y$ or $P_XI_Y+P_NI_1$, where the "+" denotes a "merge" operator). Regarding these illustrative combinations, it should be understood that the intent mapping 218 can be used to determine the outcome of the intent merging. That is, the determination of which of the possible combinations (e.g., $P_1I_1+P_XI_Y$ or $P_XI_Y+P_1I_1$, $P_NI_1+P_XI_Y$ or $P_XI_Y+P_NI_1$) is made based on the intent mapping 218. At block 322 or block 336, the system 100 passes or makes available the "final" combined (shared) intent to the VPA engine 124 (e.g., to be acted upon by the reasoner 126, in some embodiments). By storing the shared intents in the shared dialog context 220, the system 100 allows the shared intents to be subsequently or iteratively updated to include additional semantic information derived from the multi-person dialog session 300 as the conversation unfolds. As a result, even already-shared intents can be updated or revised as needed in response to negotiations, topic changes, and/or other dialog behavior by the human participants.

Figure 4:
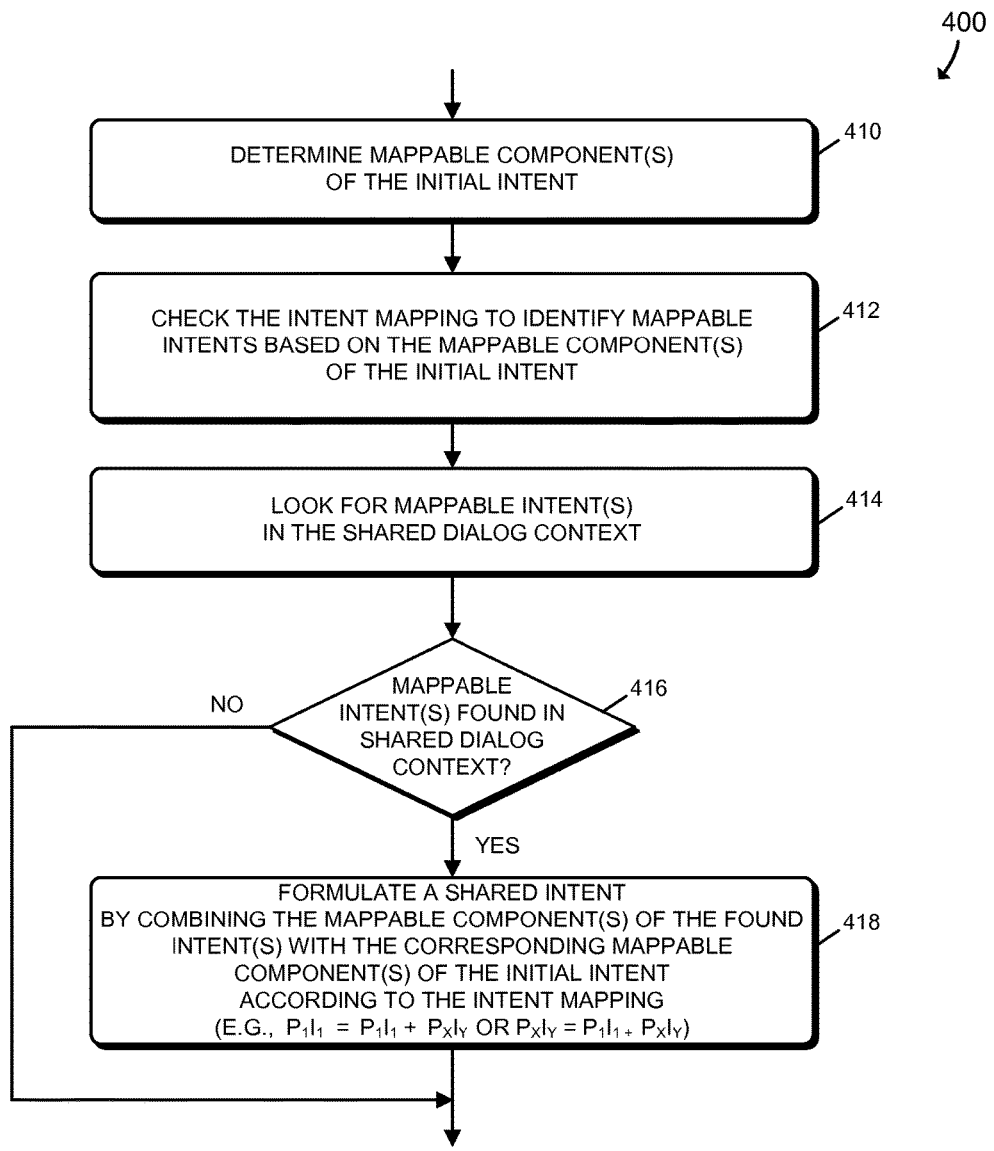
FIG. 4 is a simplified flow diagram of at least one embodiment of a method for creating a shared intent with the computing system of FIG. 1.

Referring now to FIG. 4, an illustrative method 400 for creating a shared intent with the VPA 110, based on an initial intent, is shown. The method 400 may be embodied as computerized programs, routines, logic and/or instructions executed by the computing system 100, for example by the shared dialog understanding module 120. At block 410, the system 100 determines the mappable components of the initial intent. As used herein, "mappable components" may refer to, among other things, portions of the initial intent that may correspond to portions of other intents that are defined for the VPA 110 or more particularly, the domain application 112. One or more of the mappable components may be used by the system 100 to locate potentially mappable intents in the shared dialog context 220. To determine the mappable components of the initial intent, the system 100 may examine the definition of the intent, which may be contained in, for example, the domain model 122 or the VPA model 130. As shown in Table 1 above, an intent definition may specify, for example, the intent name, intent parameter names, and data types associated with one or more of the intent parameters, any of which may be used as a mappable component. The intent definition may also include an indication of which parameters of the intent are mappable. Some intent parameters may be mappable whereas others may not be mappable. As an example, intent parameters that relate to people names, dates, locations, objects and events may be considered mappable while intent parameters that have applicability only to a certain, specific intent may not be mappable to other intents.

At block 412, the system 100 accesses the intent mapping 218 to determine, based on the intent mapping 218 and the mappable components of the initial intent, one or more intents that can be mapped to the initial intent. For example, an intent may be mappable to the initial intent according to the intent mapping 218 based on a common data type, even if the intent names or parameter names are different. Further, intents may be mappable to one another even if not all of their parameters are mappable. Additionally, intent mappings may be flexible in that if one intent is defined as mapping to another intent, the reverse is also true. Moreover, intents relating to the same domain application 112 may be more likely to be mappable than intents that are created for different domain applications 112. On the other hand, some intents (such as partial intents like PersonName or DateAndLocation) may be mappable across domain applications 112. Referring to the illustration of Table 2 above, the intent PersonName is mappable to the CreateCalendarEvent intent because the FirstName and LastName parameters of the PersonName intent are defined as mapping to the Attendee parameter of the CreateCalendarEvent.

At block 414, the system 100 accesses the shared dialog context 220 and looks for instances of the mappable intents determined at block 412, in the shared dialog context 220. Thus, in the example above, if the initial intent is CreateCalendarEvent, the system 100 may look for the most recently occurring instance of a DateAndLocation intent in the shared dialog context 220, or vice versa. As discussed above in connection with FIG. 2, where there are multiple instances of mappable intents in the shared dialog context 220, the system 100 may utilize any suitable criteria to select a mappable intent.

The system 100 determines whether an instance of a mappable intent has been found in the shared dialog context 220 at block 416, and at block 418, the system 100 combines the mappable components of the found intent with the corresponding mappable components of the initial intent. Such combination may be performed in any order; that is, either the initial intent or the intent found in the shared dialog context 220 may be used as the basis for the combination. Further, intents may be combined irrespective of their status. For example, partial intents may be combined with other partial intents, partial intents may be combined with complete intents, complete intents may be combined with partial intents, and complete intents may be combined with other complete intents. As noted above, where there are multiple potentially mappable intents in the shared dialog context 220, the selection of a mappable intent from the shared dialog context 220 is typically based on temporal criteria (e.g., the most recently created or updated mappable intent is selected). However, in some embodiments, the output of the semantic parsing subsystem 118 with respect to an intent in the shared dialog context 220 may also be considered by the VPA 110. For instance, referring to the example of FIG. 5, suppose that the dialog participants go on to talk about something else after the portion of the conversation that occurs in FIG. 5 (e.g. a birthday party for Mom) has ended. After talking about Mom's birthday party, Jane might say, "You know, on our DisneyWorld trip, we should also include a water park." The VPA 110 generates a partial intent and maps the partial intent to the "Plan a family trip" intent, which occurred temporally farther back in the conversation. In determining that the "water park" partial intent should be mapped with the "family trip" intent stored in the shared dialog context 220, the VPA 110 determines that both intents have "Destination=DisneyWorld" in common. Based on the common parameter and data value, the VPA 110 infers that this mapping should be used.

Example Usage Scenarios

Referring now to FIG. 5, an example of iterative intent sharing by the computing system 100 to create an action item at the conclusion of a multiple-round, multi-person dialog session 500 is shown. The elements 510, 514, 520, 526, 532 illustrate instances of natural language dialog input received by the system 100 from different human participants in the dialog session 500 (where Jane, Bob, and Susan are the different participants). The elements 512, 516, 522, 528, 534 represent initial intents that are developed from the corresponding dialog instances 510, 514, 520, 526, 532, by the system 100 (e.g., by the semantic parsing subsystem 118). The elements 518, 524, 530, 536 represent shared intents that are developed based on the next-occurring initial intent and the shared dialog context 220. At the beginning of the conversation, Jane suggests that everyone get together for a family vacation to DisneyWorld this summer Jane's dialog input is represented semantically as the initial intent 512 (which is a complete intent as described above). As the shared dialog context 220 is currently empty at this point, the system 100 does not yet create a shared intent, but stores the intent 512 in the shared dialog context 220. In the dialog instance 514, Bob comments favorably on Jane's suggestion, and the system 100 represents Bob's comment as the initial intent 516 (which is a partial intent as described above). The system 100 finds the intent 512 in the shared dialog context 220 and merges the intent 516 with the intent 512 to create the shared intent 518. In doing so, the system 100 adds data from the intent 516 (indicating that Bob's family is interested in the vacation) to the "Attendees" data field of the intent 512, while preserving all of the information that was already in that data field.

In the dialog instance 520, Susan indicates that her son is interested in Magic Kingdom, and the system 100 represents Susan's comment as the initial intent 522 (which is a partial intent). The initial intent 522 is the same intent type as the intent 516, and the intent 522 contains an additional parameter and data value (Interests=Magic Kingdom). Looking at the shared dialog context 220, the system 100 merges the intent 522 with the previously-created shared intent 518 to create the shared intent 524. In general, a shared intent may be implemented either as an updated version of a previously-created shared intent or as a new intent. In the shared intent 524, the information provided by the intent 522 is added to the Attendees data field of the PlanFamilyVacation intent and the Interests data field is newly populated with the data value of Magic Kingdom.

With the dialog instance 526, Bob indicates that his family is not available until after school gets out, but is available during the rest of the summer. The system 100 interprets these statements based on, e.g., the domain model 122, and prepares the initial intent 528 (which is a partial intent), indicating that Bob's family is available from June 15 to September 1. Looking at the shared dialog context 220, the system 100 merges the intent 528 with the shared intent 524 to create the shared intent 530. In the shared intent 530, the dateRange data field is added to the PlanFamilyVacation intent and filled with the date range that is acceptable to Bob's family.

With the dialog instance 532, Jane indicates that August is the best time for her family to join the vacation. The system 100 formulates the initial intent 534 (which is a partial intent) indicating the acceptable date range for Jane's family Looking at the shared dialog context 220, the system 100 merges the intent 534 with the shared intent 530 to create the shared intent 536. In the shared intent 536, the dateRange data filed is updated to include Jane's preferred date range. As shown, both Bob's date range and Jane's date range are retained in the shared intent 536 (e.g., in an array).

The system 100 determines that the shared intent 536 is ready for further processing by the VPA 110. To do this, the system 100 may evaluate the number of data fields that are populated in the intent, or may detect from its analysis of the conversation that the dialog session 500 has concluded, or may determine that at least the portion of the dialog session 500 relating to a discussion of family vacation planning has ended. In response to one or more of these or other triggers, the system 100 may forward or makes available the shared intent 536 to the VPA engine 124 (e.g., the reasoner 126, in some embodiments). The reasoner 126 may then execute a task flow in response to the shared intent 536 to create an action item, e.g., a to-do list 538. In doing so, the reasoner 126 extracts the semantic information from the shared intent 536 and resolves conflicting information. For instance, the reasoner 126 compares Bob's date range to Jane's date range and determines the "intersection" of the two date ranges, or the portions that overlap (August). In other situations, the system 100 may use other criteria or other techniques for resolving conflicting data values in shared intents. For instance, the system 100 may assign different priorities or weights to different data values or parameters and use those priorities or weights to resolve conflicts. Such priorities or weights may be stored in, for example, the domain model 122.

Illustratively, the output generator 128 prepares a visual representation of the to-do list 538 and presents it to one or more of the conversation participants (e.g., on a display screen of a local electronic device, such as a smartphone, tablet computer, or wearable electronic device). In other contexts, the output generator 128 may present the output in another form. For example, if the system 100 is implemented in a vehicle and the driver of the vehicle is Jane, the output generator 128 may present speech output informing Jane that the to-do list 538 has been created, verbally summarize the details of the to-do list 538, and ask Jane to respond verbally as to whether to, for example, post the to-do list 538 to a calendar or task list on Jane's mobile device, send the to-do item to other family members, or take some other action with respect to the to-do item.

Figure 6:
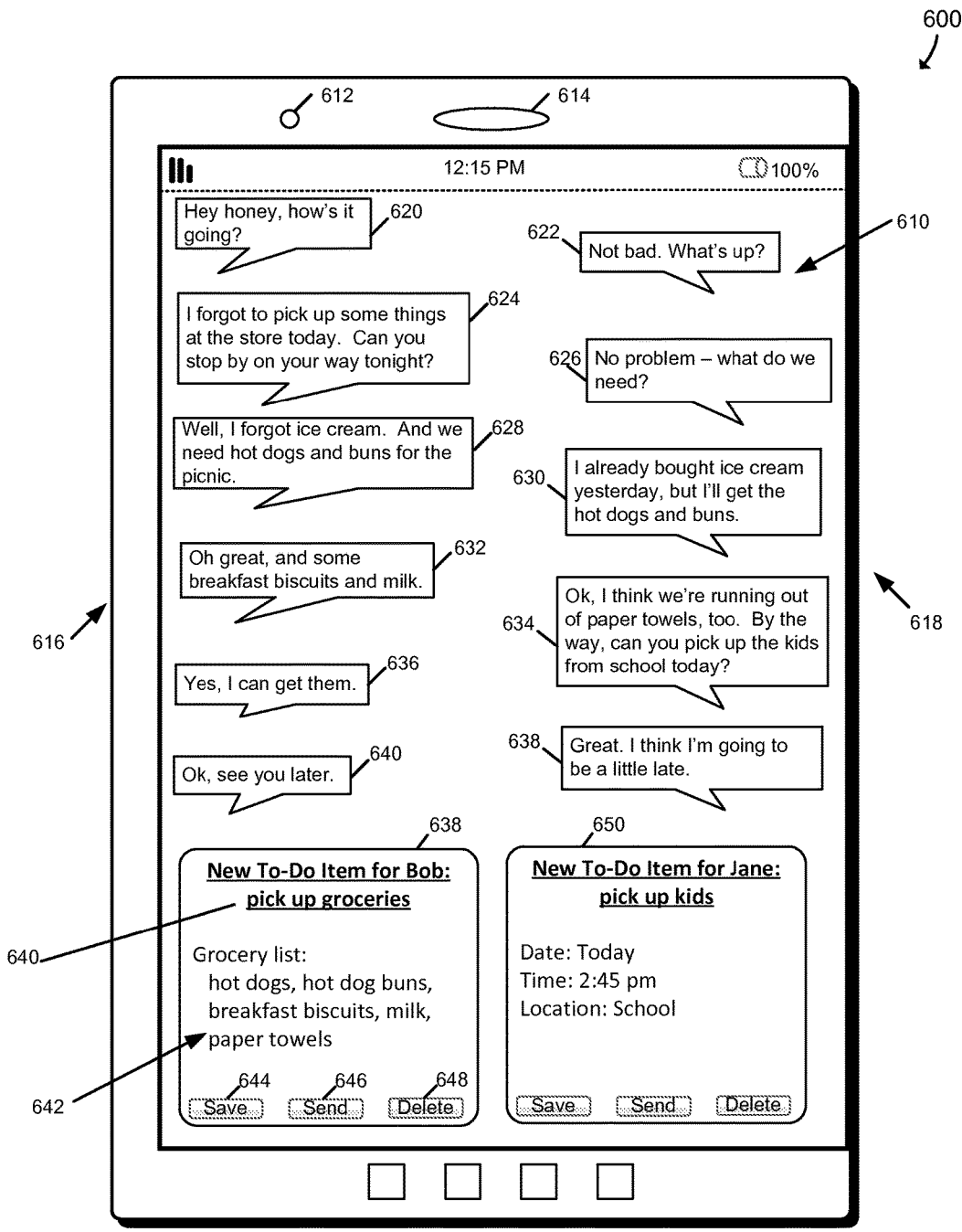
FIG. 6 is a simplified plan view of at least one embodiment of a computing device including a display screen illustrating the following by the computing device of a multi-user dialog interaction and the presentation by the computing device of an action item created as a result of intent sharing by the computing system of FIG. 1.

Referring now to FIG. 6, an example of a multi-person dialog session followed by the VPA 110 and resulting in the creation of at least one electronic action item 638, is shown. The illustrative multi-person dialog session involves two participants and a computing system 600. Illustratively, the computing system is embodied as a mobile electronic device such as a smart phone, tablet computer, smart appliance, or wearable computing device, in which a number of sensing devices 612, 614 are integrated (e.g., a two-way camera, multidirectional microphone, etc.). The dialog session is illustrated as occurring on a display screen 610 of the computing system 600; however, all or portions of the dialog session may be accomplished using audio, e.g., a spoken natural-language interface, rather than a visual display.

The dialog session involves person-supplied natural-language dialog 616 of a first participant and person-supplied natural-language dialog 618 of a second participant in the dialog session. In the illustrated example, the first speaker initiates the dialog at box 620. Illustratively, the first speaker has the VPA 110 installed on the system 600, and has initiated the dialog session by placing a telephone call to the second speaker via the computing system 600. Upon receiving the dialog instance 622 from the second speaker, the system 600 detects a multi-person dialog session involving speaker 1 and speaker 2. The system may identify each of speaker 1 and speaker 2 as being different sources of natural language dialog input by, for example, a device ID or network address associated with instances of the user's input. Based on these identifiers, alone or in combination with information in the dialog model 122, user preferences, or other information available to the system 600, the system 600 may determine from the greeting at box 620 that speaker 1 is Jane and speaker 2 is her husband, Bob. At box 624, the system 600 interprets Jane's natural language dialog as a request to Bob to pick up groceries tonight, and formulates an initial intent such as PickUpGroceries(user=Bob, date=tonight). At box 626, the system 600 interprets Bob's reply as indicating agreement with the request, and updates the intent to add an "agreement" parameter: PickUpGroceries(user=Bob, date=tonight, agreed=yes). At box 628, the system 600 formulates an intent, e.g.: GroceryList(ice cream, hot dogs, hot dog buns), based on its interpretation of Jane's dialog input, finds the PickUpGroceries intent in the shared dialog context 200, and merges it with the GroceryList intent, resulting in an intent, e.g.: PickUpGroceries (user=Bob, date=tonight, [list=ice cream, hot dogs, hot dog buns], agreed=yes).

At box 630, Bob states that he has already purchased ice cream. Based on its semantic interpretation of Bob's dialog input, the system 600 detects a lack of agreement as to the ice cream grocery list item, and formulates an intent, e.g.: PickUpGroceries(user=Bob, date=tonight, [list=hot dogs, hot dog buns], agreed=yes). In other words, based on the detected lack of agreement, in this example, the system 600 deletes a data value from the shared intent. At box 632, the system 600 formulates a new GroceryList intent and merges it with the most recently created PickUpGroceries intent contained in the shared dialog context 220, resulting in an intent, e.g.: PickUpGroceries(user=Bob, date=tonight, [list=hot dogs, hot dog buns, breakfast biscuits, milk], agreed=yes). Alternatively, at box 632, Jane might use the camera of the system 600 to take a picture of the desired box of breakfast biscuits and say, "get some breakfast biscuits like these." In that case, the system 600 includes a reference to the digital image of the box of breakfast biscuits in the PickUpGroceries intent. Thus, multi-modal information can be merged with intents that are created as a result of the natural language dialog. Further, if Bob receives another phone call halfway through the conversation with Jane, the system 600 can continue to follow Bob's conversation as it moves from one communication mode to another. To do this, the system 600 continues generating, mapping, and merging intents, switching dialog models as needed based on the current topic of conversation, and maintaining of the intents in the shared dialog context 220 (or Bob's individual portion thereof), as described above.

At box 634, the system 600 formulates another new GroceryList intent and merges it with the most recently created PickUpGroceries intent in the shared dialog context 220, resulting in an intent, e.g.: PickUpGroceries(user=Bob, date=tonight, [list=hot dogs, hot dog buns, breakfast biscuits, milk, paper towels]. Additionally, the system 600 detects dialog that does not relate to grocery shopping, but relates to another topic. That is, even though Bob uses the words "pick up" and Jane says "get," the semantic analysis performed by the system 600 determines that "kids" should not be added to the grocery list. Instead, the system 600 determines, based on the available intents in the domain model 122, for example, that a different intent, e.g., TaskItem(user=Jane, task=pick up kids, location=school, date=today), should be created. At box 636, the system 600 detects Jane's agreement and updates the intent, e.g.: TaskItem(user=Jane, task=pick up kids, location=school, date=today, agreed=yes). Based on the dialog exchange at boxes 638, 640, the system 600 concludes that the dialog session has ended. In response to the user=Bob and agreed=yes parameters of the PickUpGroceries intent, the system 600 formulates the to-do item 638 and associates it with Bob. The to-do item 638 includes the useful information gleaned from the dialog session, identifying the to-do item (at 640) (grocery list) and identifying the items placed on the list as a result of the shared intent (at 642). Additionally, the system 600 displays user-activatable controls to permit the user to save (644), send (646) or delete (648) the task item 638.

Additionally, the system 600 processes the TaskItem intent in a similar manner as the completed PickUpGroceries intent. That is, the system 600 responds to the user=Jane and agreed=yes parameters of the TaskItem intent by generating a to-do item 650 for Jane that is similar to the to-do item 638, but indicates that the task is to pick up the kids from school today. The system 600 presents user controls to permit the user (e.g., Jane) to save, send or delete the "pick up kids" to-do item as described above. In some embodiments, the system 600 may present the to-do item 638 only at Bob's local electronic device and present the to-do item 650 only at Jane's local electronic device.

Implementation Examples

Referring now to FIG. 7, a simplified block diagram of an exemplary hardware environment 700 for the computing system 100, in which the VPA 110 may be embodied, is shown. The illustrative environment 700 includes client computing devices 710, 730, each of which are in communication with one or more server computing devices 760 via one or more networks 750. Illustratively, a client component of the VPA 110 (e.g., the VPA domain application 112) is local to each of the computing devices 710, 730, while other portions of the VPA 110 (e.g., the VPA engine 124, the domain model 122, the VPA model 130, the intent mapping 218 and the shared dialog context 220) reside on the server(s) 760 (e.g., "in the cloud"). In some embodiments, portions of the VPA 110 may be stored locally while other portions thereof are distributed across a network. In some embodiments, however, the VPA 110 may be located entirely on the computing device 710. In some embodiments, portions of the VPA 110 may be incorporated into other systems or interactive software applications. Such applications or systems may include, for example, operating systems, middleware or framework (e.g., application programming interface or API) software, and/or user-level applications software (e.g., another interactive software application, such as a search engine, web browser or web site application, or a user interface for a computing device). Such applications may also include vehicle "infotainment" systems, vehicle-based VPA applications, "smart" devices (e.g., smart TVs and other smart appliances), and/or others.

The illustrative computing device 710 includes at least one processor 712 (e.g. a controller, microprocessor, microcontroller, digital signal processor, etc.), memory 714, and an input/output (I/O) subsystem 716. Although not specifically shown, embodiments of the processor 712 may include separate baseband and applications processors. Features of the baseband and applications processors may be located on the same or different hardware devices (e.g., a common substrate). The baseband processor interfaces with other components of the computing device 710 and/or external components to provide, among other things, wireless communication services, such as cellular, BLUETOOTH, WLAN, and/or other communication services. In general, the applications processor handles processing required by software and firmware applications running on the computing device 710, as well as interfacing with various sensors and/or other system resources. However, it should be understood that features typically handled by the baseband processor may be handled by the applications processor and vice versa, in some embodiments.

The computing device 710 may be embodied as any type of computing device such as a personal computer or mobile device (e.g., desktop, laptop, tablet, smart phone, body-mounted or wearable device, etc.), a server, an enterprise computer system, a network of computers, a combination of computers and other electronic devices, or other electronic devices. Although not specifically shown, it should be understood that the I/O subsystem 716 typically includes, among other things, an I/O controller, a memory controller, and one or more I/O ports. The processor 712 and the I/O subsystem 716 are communicatively coupled to the memory 714. The memory 714 may be embodied as any type of suitable computer memory device (e.g., volatile memory such as various forms of random access memory).

The I/O subsystem 716 is communicatively coupled to a number of components including a user interface subsystem 720. The user interface subsystem 720 includes one or more user input devices (e.g., a microphone, a touchscreen, keyboard, virtual keypad, etc.) and one or more output devices (e.g., audio speakers, displays, LEDs, etc.). The I/O subsystem 716 is also communicatively coupled to a data storage device 718 and a communications subsystem 724, as well as the VPA domain application 112. The data storage device 718 may include one or more hard drives or other suitable persistent data storage devices (e.g., flash memory, memory cards, memory sticks, and/or others). While not specifically shown, the I/O subsystem 716 may also be communicatively coupled to sensing devices (e.g., motion sensors, pressure sensors, kinetic sensors, temperature sensors, biometric sensors, and/or others) that are integrated with or in communication with the computing device 710, in some embodiments.

Portions of the VPA domain application 112 reside at least temporarily in the data storage device 718. Portions of the VPA domain application 112, the intent mapping 218, and/or the shared dialog context 220 may be copied to the memory 714 during operation of the computing device 710, for faster processing or other reasons.

The communication subsystem 724 may communicatively couple the computing device 710 to other computing devices and/or systems by, for example, a cellular network, a local area network, wide area network (e.g., Wi-Fi), personal cloud, virtual personal network (e.g., VPN), enterprise cloud, public cloud, Ethernet, and/or public network such as the Internet. The communication subsystem 724 may, alternatively or in addition, enable shorter-range wireless communications between the computing device 710 and other computing devices, using, for example, BLUETOOTH and/or Near Field Communication (NFC) technology. Accordingly, the communication subsystem 724 may include one or more optical, wired and/or wireless network interface subsystems, cards, adapters, or other devices, as may be needed pursuant to the specifications and/or design of the particular computing device 710. Additionally, the communication subsystem 724 may include a telephony subsystem, which enables the computing device to provide telecommunications services (e.g., via the baseband processor). The telephony subsystem generally includes a longer-range wireless transceiver, such as a radio frequency (RF) transceiver, and other associated hardware (e.g., amplifiers, etc.).

To provide voice communication services, the user interface subsystem 720 and/or the communication subsystem 724 may include an audio subsystem 722. The audio subsystem 722 may include, for example, an audio CODEC, one or more microphones, and one or more speakers and headphone jacks.

The illustrative computing device 730 is embodied similarly to the computing device 710. For example, in some embodiments, the computing devices 710, 730 may be embodied as smart phones or other mobile devices of two different users of the VPA 110. Accordingly, elements of the computing device 730 having the same or similar name as elements of the computing device 710 may be embodied similarly, and description of those elements is not repeated here.

The server(s) 760 may be embodied with components similar to those described above. Accordingly, elements of the server 760 having the same or similar name as elements of the computing device 710 may be embodied in a similar manner and according to the requirements of the server 760. As such, the description of the similar elements is not repeated here. In the illustrative server 760, the VPA engine 124 is communicatively coupled to the I/O subsystem 766. Data storage 768 is used to store portions of the domain model 122, the VPA model 130, the intent mapping 218, and the shared dialog context 220. The environment 700 may include other components, sub-components, and devices not illustrated in FIG. 7 for clarity of the description. In general, the components of the environment 700 are communicatively coupled as shown in FIG. 7 by electronic signal paths, which may be embodied as any type of wired or wireless signal paths capable of facilitating communication between the respective devices and components.

Additional Examples

According to at least one aspect of this disclosure, a machine-accessible storage medium of a computing system includes computer code to cause the computing system to operate as a virtual personal assistant ("VPA"). The computer code includes instructions executable by a processor of the computing system to: detect a natural language dialog session involving a plurality of human participants; determine semantic content of a first instance of conversational natural language input, where the first instance of conversational natural language input is supplied by one of the human participants in the dialog session; develop a first intent, where the first intent includes a structured representation of the semantic content of the first instance of conversational natural language input; access a shared dialog context, where the shared dialog context stores a plurality of intents developed by the VPA from conversational natural language inputs supplied by different human participants in the dialog session; select a second intent from the dialog context, where the second intent includes a structured representation of semantic content of a second instance of conversational natural language input, and where the second instance of conversational natural language input is supplied by another of the human participants in the dialog session; determine an intent mapping, where the intent mapping defines a relationship between a portion of the first intent and a portion of the second intent; create a shared intent by combining the portion of the first intent and the portion of the second intent based on the intent mapping; and execute an action in response to the shared intent.

The instructions may be executable by the processor to determine, with the intent mapping, a parameter of the first intent that maps to a parameter of the second intent, determine a data value associated with the parameter of the second intent, and include the data value associated with the parameter of the second intent in the shared intent. The instructions may be executable by the processor to determine a data value associated with the parameter of the first intent, and include both the data value associated with the parameter of the second intent and the data value associated with the parameter of the first intent in the shared intent. The instructions may be executable by the processor to determine a data value associated with the parameter of the first intent, and replace the data value associated with the parameter of the second intent with the data value associated with the parameter of the first intent in the shared intent. The instructions may be executable by the processor to determine a data value associated with the parameter of the first intent, compare the data value associated with the parameter of the first intent and the data value associated with the parameter of the second intent, and determine whether the human participants are in agreement as to the shared intent based on the comparison. The instructions may be executable by the processor to determine a mappable component of the first intent, the mappable component comprising one or more of: a name of the first intent, a parameter of the first intent, and a data value associated with the parameter of the first intent, and to select the second intent based on the mappable component of the first intent. The instructions may be executable by the processor to create the shared intent as an updated version of the first intent that includes the portion of the second intent. The instructions may be executable by the processor to create the shared intent as an updated version of the second intent that includes the portion of the first intent. The instructions may be executable by the processor to update the shared intent after a plurality of instances of conversational natural language input supplied by the human participants in the dialog session. The instructions may be executable by the processor to execute the action after the shared intent is updated based on the plurality of instances of conversational natural language input. The first and second intents may be different types of intents that have at least one common parameter. The first and second intents may be different types of intents and the first and second intents may have different parameters, and the instructions may be executable by the processor to determine, with the intent mapping, a parameter of the first intent that maps to a parameter of the second intent. The instructions may be executable by the processor to determine, based on the shared intent, whether the dialog session involves a negotiation between two or more of the human participants. The instructions may be executable by the processor to create an electronic action item comprising semantic information extracted from the shared intent, and to present the electronic action item to one or more of the human participants. The first intent and/or the second intent may be a partial intent and the shared intent may be a complete intent. The instructions may be executable by the processor to, in response to the shared intent, generate an electronic message and present the electronic message at a computing device of the computing system.

According to at least one aspect of this disclosure, a method for developing a semantic understanding of a natural language dialog session involving at least two human participants includes, with a computing system: determining semantic content of a first instance of natural language dialog input supplied by a first human participant in the dialog session, determining that the semantic content of the first instance of natural language dialog input comprises first incomplete information relating to a common intention of the first and second human participants; determining semantic content of a second instance of natural language dialog input supplied by a second human participant in the dialog session, determining that the semantic content of the second instance of natural language dialog input comprises second incomplete information relating to the common intention of the first and second human participants; and formulating a structured representation of the common intention of the first and second human participants, the structured representation comprising a portion of the semantic content of the first instance of natural language dialog input and a portion of the semantic content of the second instance of natural language dialog input.

The method may include determining that the second incomplete information of the semantic content of the second instance of natural language dialog input relates to the first incomplete information of the semantic content of the first instance of natural language dialog input. The method may include, in response to formulating the structured representation of the common intention, executing an action on a computing device of the computing system. The method may include, in response to formulating the structured representation of the common intention, generating an electronic document and presenting the electronic document at a computing device of the computing system.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A non-transitory machine-accessible storage medium coupled with a processor of a computing system, the machine-accessible storage medium comprising computer code, the computer code comprising instructions that when executed by the processor cause the computing system to:
  by a microphone, receive instances of conversational natural language input of a natural language dialog session involving a plurality of human participants;
  determine semantic content of a first instance of the received instances of conversational natural language input, the first instance of conversational natural language input supplied by one of the human participants in the dialog session;

develop a first intent, the first intent comprising a structured representation of the semantic content of the first instance of conversational natural language input;

access a shared dialog context, the shared dialog context storing a plurality of intents developed from others of the received instances of conversational natural language input supplied by different human participants in the dialog session;

select a second intent from the shared dialog context, the second intent comprising a structured representation of semantic content of a second instance of conversational natural language input, the second instance of conversational natural language input supplied by another one of the human participants in the dialog session;

determine an intent mapping, the intent mapping defining a relationship between a portion of the first intent and a portion of the second intent;

create a shared intent by combining the portion of the first intent and the portion of the second intent based on the intent mapping;

instantiate the shared intent with data values extracted from at least the first and second instances of conversational natural language input;

in response to instantiation of the shared intent and using information extracted from the shared intent, generate and present, by an output device, an action item.

2. The machine-accessible storage medium of claim 1, wherein the instructions when executed by the processor further cause the computing system to determine a data value associated with the parameter of the first intent, and include both the data value associated with the parameter of the second intent and the data value associated with the parameter of the first intent in the shared intent.

3. The machine-accessible storage medium of claim 1, wherein the instructions when executed by the processor further cause the computing system to determine a data value associated with the parameter of the first intent, and replace the data value associated with the parameter of the second intent with the data value associated with the parameter of the first intent in the shared intent.

4. The machine-accessible storage medium of claim 1, wherein the instructions when executed by the processor further cause the computing system to determine a data value associated with the parameter of the first intent, compare the data value associated with the parameter of the first intent and the data value associated with the parameter of the second intent, and determine whether the human participants are in agreement as to the shared intent based on the comparison.

5. The machine-accessible storage medium of claim 1, wherein the instructions when executed by the processor further cause the computing system to determine a mappable component of the first intent, the mappable component comprising one or more of: a name of the first intent, a parameter of the first intent, and a data value associated with the parameter of the first intent, and to select the second intent based on the mappable component of the first intent.

6. The machine-accessible storage medium of claim 1, wherein the instructions when executed by the processor further cause the computing system to create the shared intent as an updated version of the first intent that includes the portion of the second intent.

7. The machine-accessible storage medium of claim 1, wherein the instructions when executed by the processor further cause the computing system to create the shared intent as an updated version of the second intent that includes the portion of the first intent.

8. The machine-accessible storage medium of claim 1, wherein the instructions when executed by the processor further cause the computing system to update the shared intent after a plurality of instances of conversational natural language input supplied by the human participants in the dialog session.

9. The machine-accessible storage medium of claim 8, wherein the instructions when executed by the processor cause the computing system to execute the action after the shared intent is updated based on the plurality of instances of conversational natural language input.

10. The machine-accessible storage medium of claim 1, wherein the first and second intents are different types of intents that have at least one common parameter.

11. The machine-accessible storage medium of claim 1, wherein the first and second intents are different types of intents and the first and second intents have different parameters, and the instructions when executed by the processor cause the computing system to determine, with the intent mapping, a parameter of the first intent that maps to a parameter of the second intent.

12. The machine-accessible storage medium of claim 1, further comprising instructions when executed by the processor cause the computing system to determine, based on the shared intent, whether the dialog session involves a negotiation between two or more of the human participants.

13. The machine-accessible storage medium of claim 1, further comprising instructions when executed by the processor cause the computing system to create an electronic action item comprising semantic information extracted from the shared intent, and to present the electronic action item to one or more of the human participants.

14. The machine-accessible storage medium of claim 1, wherein at least one of the first intent and the second intent is a partial intent and the shared intent is a complete intent.

15. The machine-accessible storage medium of claim 1, wherein the instructions when executed by the processor cause the computing system to, in response to the shared intent, generate an electronic message and present the electronic message at a computing device of the computing system.

16. The machine-accessible storage medium of claim 1, further comprising instructions when executed by the processor cause the computing system to create at least one list comprising semantic information extracted from the shared intent, and present the at least one list to one or more of the human participants.

17. A computer-implemented method for developing a semantic understanding of a natural language dialog session involving at least two human participants, comprising executing on a processor the steps of:

by a microphone, receive instances of conversational natural language input of a natural language dialog session involving a plurality of human participants;

determining semantic content of a first instance of the received instances of natural language dialog input, the first instance supplied by a first human participant in the dialog session;

determining that the semantic content of the first instance of natural language dialog input comprises first incomplete information relating to a common intention of the plurality of human participants;

determining semantic content of a second instance of the received instances of natural language dialog input, the second instance supplied by a second human participant in the dialog session;

determining that the semantic content of the second instance of natural language dialog input comprises second incomplete information relating to the common intention of the plurality of human participants;

determining that the second incomplete information of the semantic content of the second instance of natural language dialog input relates to the first incomplete information of the semantic content of the first instance of natural language dialog input;

formulating a structured representation of the common intention to create a shared intent of the plurality of human participants, the structured representation comprising a portion of the semantic content of the first instance of natural language dialog input and a portion of the semantic content of the second instance of natural language dialog input;

instantiating the shared intent with data values extracted from at least the first and second instances of conversational natural language input;

in response to instantiation of the shared intent and using information extracted from the shared intent, executing an action item on a computing device of the computing system.

18. The method of claim 17, comprising in response to formulating the structured representation of the common intention, generating an electronic document and presenting the electronic document at a computing device of the computing system.

19. The method of claim 17, further comprising:
creating at least one list comprising semantic information extracted from the shared intent that is specific to one of the human participants, present the list to the one of the human participants, and present different output to the other one of the human participants.

* * * * *